(12) United States Patent
Joe et al.

(10) Patent No.: US 7,164,247 B2
(45) Date of Patent: Jan. 16, 2007

(54) MOTOR TORQUE CONTROL APPARATUS AND METHOD FOR AUTOMOTIVE VEHICLE

(75) Inventors: Shinichiro Joe, Yokohama (JP); Taketoshi Kawabe, Fukuoka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/180,559

(22) Filed: Jul. 14, 2005

(65) Prior Publication Data

US 2006/0017414 A1    Jan. 26, 2006

(30) Foreign Application Priority Data

| Jul. 21, 2004 | (JP) | ............................... 2004-213686 |
| Aug. 3, 2004 | (JP) | ............................... 2004-227067 |
| Aug. 3, 2004 | (JP) | ............................... 2004-227070 |

(51) Int. Cl.
    *H02P 7/00*    (2006.01)
(52) U.S. Cl. ....................... 318/432; 318/609; 318/610; 318/430; 180/65.2
(58) Field of Classification Search ................ 318/139, 318/140, 245, 254, 266, 280, 376; 701/22, 701/100; 477/2, 3, 5, 35; 180/65.2
    See application file for complete search history.

(56) References Cited

U.S. PATENT DOCUMENTS

| 5,865,263 | A | 2/1999 | Yamaguchi et al. | |
| 2002/0062183 | A1* | 5/2002 | Yamaguchi et al. | ........... 701/22 |
| 2003/0062206 | A1* | 4/2003 | Fujikawa | .................... 180/65.2 |
| 2003/0173123 | A1* | 9/2003 | Nakanowatari | ............ 180/65.2 |
| 2003/0173934 | A1* | 9/2003 | Arimitsu | ....................... 322/34 |
| 2004/0009842 | A1* | 1/2004 | Inada | ............................ 477/5 |
| 2004/0040758 | A1* | 3/2004 | Shimizu | .................... 180/65.2 |
| 2004/0149501 | A1* | 8/2004 | Imazu et al. | ............... 180/65.2 |
| 2004/0162182 | A1* | 8/2004 | Joe et al. | ........................ 477/2 |
| 2004/0198551 | A1* | 10/2004 | Joe et al. | ........................ 477/3 |
| 2004/0256165 | A1* | 12/2004 | Tomita et al. | ............. 180/65.2 |
| 2005/0101433 | A1* | 5/2005 | Joe | ................................ 477/5 |
| 2005/0107207 | A1* | 5/2005 | Imazu et al. | ................... 477/35 |
| 2005/0189894 | A1* | 9/2005 | Komiyama et al. | ......... 318/376 |
| 2005/0228554 | A1* | 10/2005 | Yamamoto et al. | ........... 701/22 |
| 2005/0288844 | A1* | 12/2005 | Kimura et al. | .............. 701/100 |

FOREIGN PATENT DOCUMENTS

| JP | 61-005318 A | 1/1986 |
| JP | 8-232817 A | 9/1996 |

\* cited by examiner

*Primary Examiner*—Paul Ip
(74) *Attorney, Agent, or Firm*—Foley & Lardner LLP

(57) ABSTRACT

A motor torque control apparatus for an automotive vehicle includes a transmission which has either one of a fixed speed ratio and a variable speed ratio; at least one motor/generator coupled with the transmission as a propelling power source of the vehicle, a power of the power source being transmitted to a road wheel for propulsion of the vehicle through the transmission; and a controller configured to be electrically connected to the motor/generator for motor torque control. Moreover, this controller includes a disturbance observer that estimates a driving force, and a motor torque control section that controls the driving force estimated by the disturbance observer, to bring the estimated driving force closer to a target driving force by way of servo control.

20 Claims, 13 Drawing Sheets

EV MODE

EV-LB MODE

LB MODE

E-iVT MODE

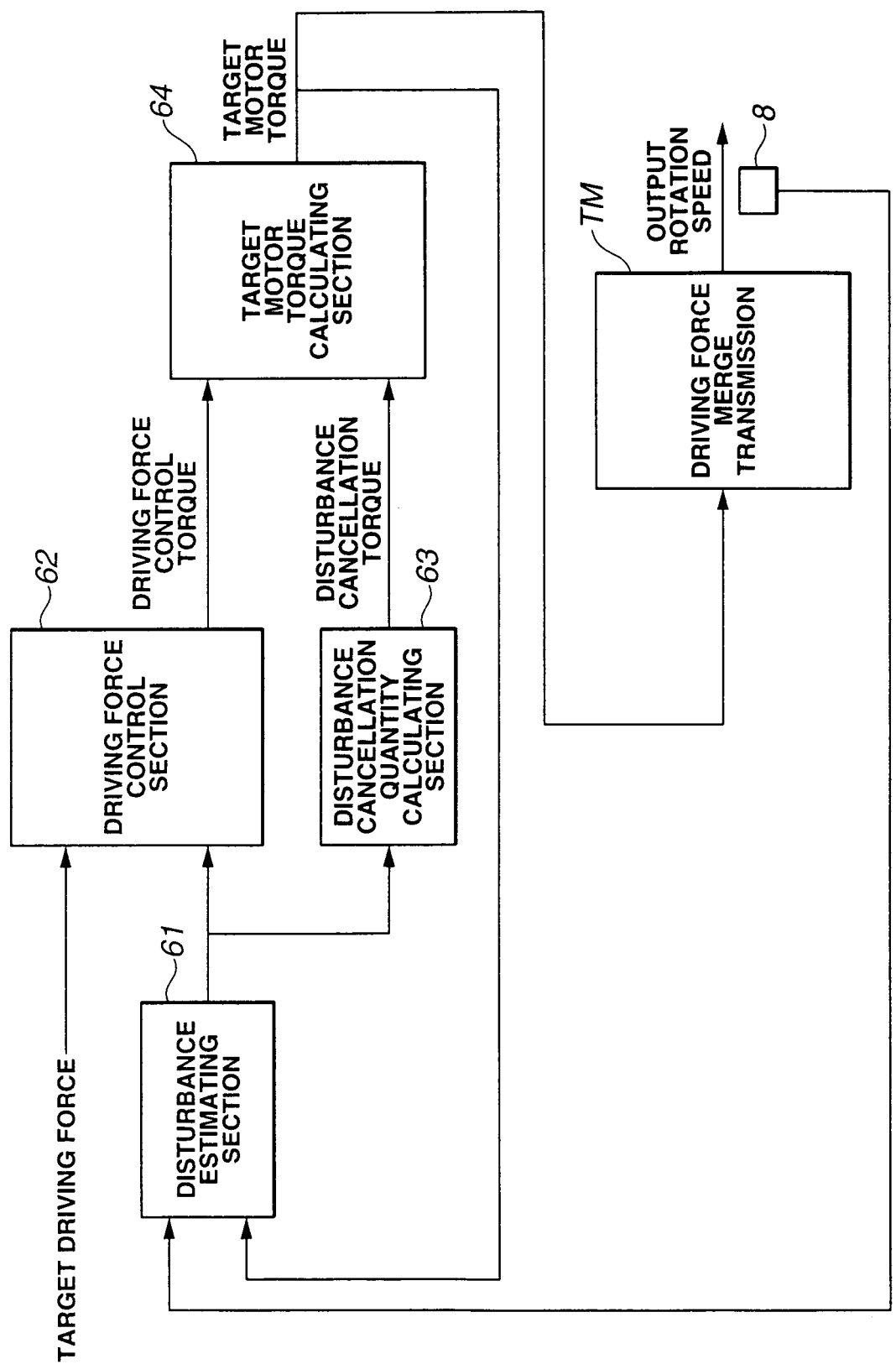

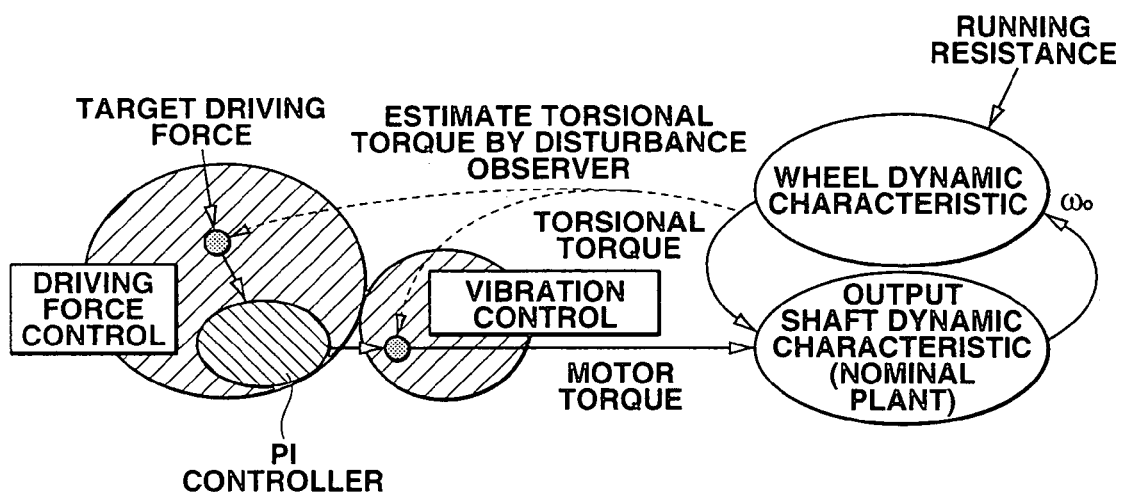
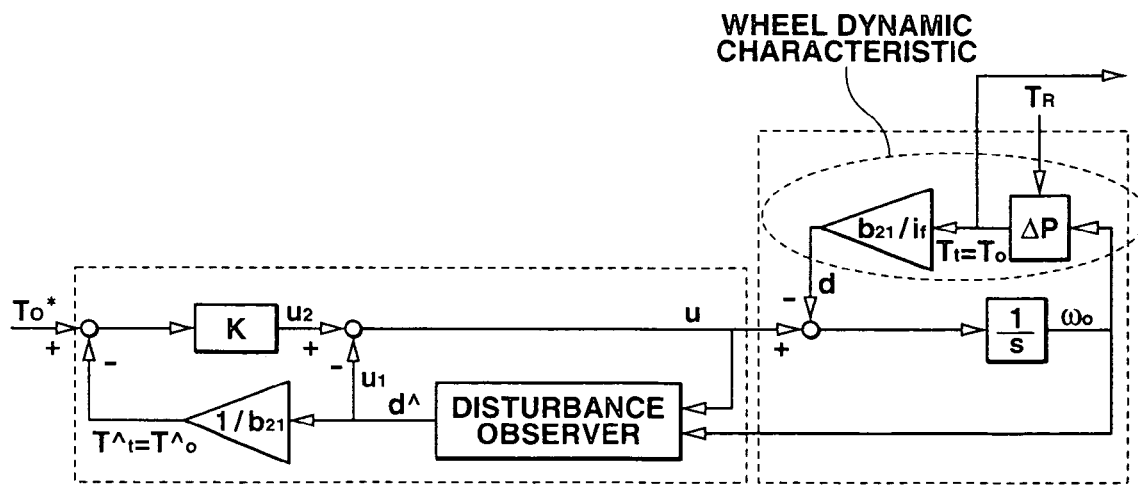

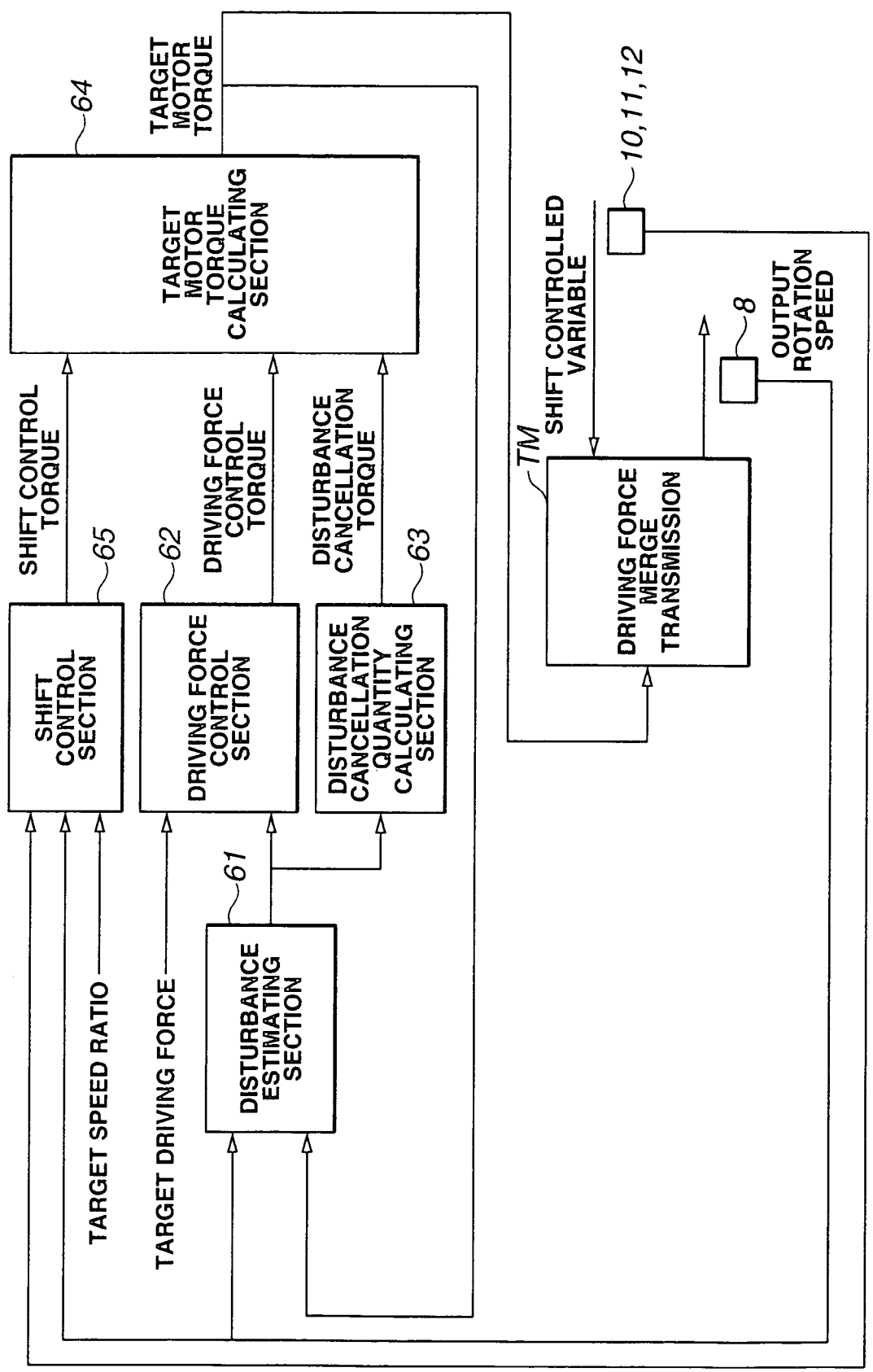

MOTOR TORQUE CONTROL APPARATUS AND METHOD FOR AUTOMOTIVE VEHICLE

BACKGROUND OF THE INVENTION a) Field of the Invention

The present invention relates to motor torque control apparatus and method for an electric or hybrid vehicle which has at least one motor/generator as a power source (or, drive source).

b) Description of the Related Art

A Japanese Patent Provisional Publication No. H8(1996)-232817 published on Sep. 10, 1996 exemplifies a previously proposed motor torque control apparatus for a hybrid vehicle which runs by torque produced by a motor in accordance with a target driving force. In this proposed motor torque control apparatus, a target motor torque is calculated according to a vehicle speed and an accelerator opening, and then the motor is so controlled as to achieve this target motor torque.

SUMMARY OF THE INVENTION

However, in the above-described previously proposed motor torque control technique, the target motor torque corresponding to the target driving force is calculated according to a vehicle speed and accelerator opening, by means of feedforward control. Hence, inertias of drive system (or, drive train) are used for acceleration or deceleration of the vehicle, during transient time of the acceleration or deceleration of the vehicle. Due to this, there is a possibility that the target driving force deviates from an actual driving force, hence a desired acceleration or deceleration of the vehicle cannot be achieved.

It is, therefore, an object of the present invention to provide motor torque control apparatus or method for an automotive vehicle, which is capable of attaining a desired acceleration or deceleration of the vehicle by reducing the influence of such inertias in the drive system during transient time of the acceleration or deceleration of the vehicle.

According to one aspect of the present invention, there is provided a motor torque control apparatus for an automotive vehicle, comprising: a transmission which has either one of a fixed speed ratio and a variable speed ratio; at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to bring the estimated driving force closer to a target driving force by way of servo control.

According to another aspect of the present invention, there is provided a motor torque control method for an automotive vehicle, the vehicle being an electric or hybrid vehicle which has at least one motor-and-generator as a propelling power source and which runs by transmitting a power of the power source to a road wheel through a transmission, the motor torque control method comprising: estimating a driving force of the vehicle by a disturbance observer; and controlling the motor-and-generator to bring the estimated driving force closer to a target driving force by way of servo control.

The other objects and features of this invention will become understood from the following description with reference to the accompanying drawings.

BRIEF DESCRIPTION OF THE DRAWINGS

FIG. 5 is a schematic block diagram representing some elements of a motor torque control apparatus according to a first embodiment of the present invention.

FIG. 6 is an explanatory view representing concepts of the motor torque control according to the first embodiment.

FIG. 7 is a schematic block diagram explaining the motor torque control according to the first embodiment.

FIG. 8 is a schematic block diagram representing some elements of a motor torque control apparatus according to a second embodiment of the present invention.

DETAILED DESCRIPTION OF THE INVENTION

Reference will hereinafter be made to the drawings in order to facilitate a better understanding of the present invention.

At first, a configuration of drive system of a hybrid vehicle will now be explained.

Figure 1:
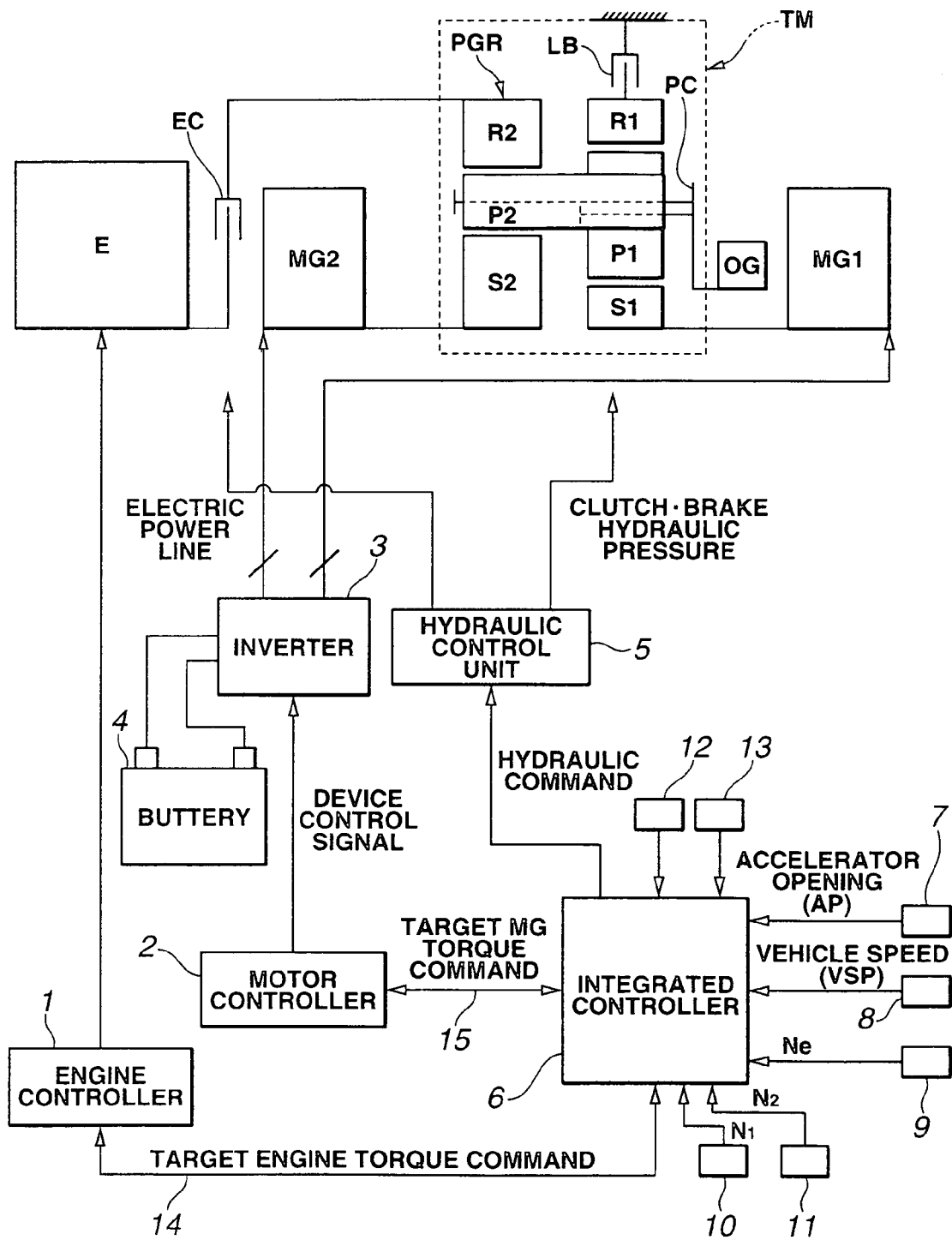
FIG. 1 is a schematic block diagram representing a drive system of a hybrid vehicle to which a motor torque control apparatus according to the present invention is applied.

FIG. 1 is a schematic block diagram representing drive system of a hybrid vehicle to which a motor torque control apparatus according to the present invention is applied. This drive system of the hybrid vehicle includes an engine E, a first motor/generator MG1, a second motor/generator MG2, an output gear OG (i.e., output member), and a hybrid transmission (i.e., driving force merging transmission) TM, as shown in FIG. 1.

Engine E as a propelling power source of the vehicle is, for example, a gasoline engine or a diesel engine. For example, a valve opening degree of throttle valve of engine E is controlled on the basis of a control command derived from an engine controller 1 described below.

First motor/generator MG1 and second motor/generator MG2 as propelling power sources of the vehicle are synchronous-type motor/generator(s) whose rotor includes a permanent magnet, and whose stator includes a wound stator coil. Respective first motor/generator MG1 and second motor/generator MG2 are independently controlled by impressing (applying) 3-phase alternating current produced by an inverter 3 on the basis of a control command (i.e., device control signal) derived from a motor controller 2 described below.

Hybrid transmission TM includes a Ravigneaux-type planetary gear train PGR (i.e. differential gear, or differential mechanism) and a low brake LB. Ravigneaux-type planetary gear train PGR includes a first sun gear S1, a first pinion P1, a first ring gear R1, a second sun gear S2, a second pinion P2, a second ring gear R2, and a common carrier PC supporting first pinion P1 and second pinion P2 meshing with each other. Namely, Ravigneaux-type planetary gear train PGR has five rotation elements (or, members) of first sun gear S1, first ring gear R1, second sun gear S2, second ring gear R2, and common carrier PC. Connection relationship of input/output members for these five rotation elements will now be explained.

First sun gear S1 is coupled with first motor/generator MG1. First ring gear R1 is so disposed that first ring gear R1 can be fixed to a casing of transmission TM, through low brake LB corresponding to a friction element. Second sun gear S2 is coupled with second motor/generator MG2. Second ring gear R2 is coupled with engine E through an engine clutch EC corresponding to a friction element. Common carrier PC is directly connected with output gear OG. In addition, driving force (or, torque) is transmitted from output gear OG through a differential-unit or a drive shaft (wheel shaft) to both sides of driving wheels (i.e., from output gear OG to driven side's part of the drive system). Thus, the vehicle runs by transmitting the power of the power source through hybrid transmission TM to the road wheel(s) connected to hybrid transmission TM. In other words, power of the power source is transmitted to the wheels for propulsion of the vehicle through hybrid transmission TM.

Thereby, as shown in FIG. 2, first motor/generator MG1 (first sun gear S1), engine E (second ring gear R2), output gear OG (common carrier PC), low brake LB (first ring gear R1), and second motor/generator MG2 (second sun gear S2) can be arrayed by this order on an alignment chart (or also called, lever diagram). Hence, the rigid-body lever model which can simply express dynamic motion of Ravigneaux-type planetary gear train PGR is available. The "alignment chart" is a speed (or, velocity) diagram used for an easier and more intelligible method for solving a speed ratio (or, gear ratio) by drawings, with which a method for solving the speed ratio by formulas is replaced, when considering the speed ratio in the differential gear. Each rotation speed of the corresponding rotation element is taken along the vertical axis of the alignment chart, and each rotation element is taken along the lateral axis thereof. Each space between rotation elements on the lateral axis is so arranged as to satisfy a lever ratio of the alignment chart (i.e., ratio of lever's length between two rotation elements) based on gear (teeth number) ratio of sun gear(s) and ring gear(s) of the gear train. Therefore, in this case according to the present invention, two input/output members (or, rotation elements) of engine E and output member OG are respectively arrayed inwardly on the alignment chart of Ravigneaux-type planetary gear train PGR, and two input members of first motor/generator MG1 and second motor/generator MG2 are respectively arrayed outwardly on the alignment chart, by the above-described order, on the basis of the gear (or, teeth number) ratio of the sun gears and the ring gears of Ravigneaux-type planetary gear train PGR. In other words, (the sun gears and the ring gears of) Ravigneaux-type planetary gear train PGR, and connections of respective input/output elements and friction elements with Ravigneaux-type planetary gear train PGR, are designed to satisfy the later-described movement of the lever shown in FIGS. 2A–2D.

Engine clutch EC and low brake LB are a multiple-disc friction clutch and a multiple-disc friction brake, which are engaged by hydraulic pressure produced by a hydraulic (pressure) control unit 5 as will be described below. Engine clutch EC is aligned on a rotation speed (vertical) axis of second ring gear R2 together with engine E, on the alignment chart in FIG. 2. Low brake LB is aligned on a rotation speed (vertical) axis of first ring gear R1 on the alignment chart in FIG. 2. This rotation speed axis of first ring gear R1 is located between a rotation speed axis of output gear OG and a rotation speed axis of second sun gear S2.

Next, a control system configuration of the hybrid vehicle will now be explained. The control system of the hybrid vehicle according to the present invention includes engine controller 1, motor controller 2, inverter 3, a battery 4, hydraulic control unit 5, an integrated controller 6, an accelerator opening (degree) sensor 7, a vehicle speed sensor 8, an engine rotation speed sensor 9, a first motor/generator rotation speed sensor 10, a second motor/generator rotation speed sensor 11, a second ring gear rotation speed sensor 12, and a wheel speed sensor 13, as shown in FIG. 1.

Engine controller 1 outputs a command which controls the operating point of the engine (i.e., an engine speed Ne and an engine torque Te) to, for example, a throttle valve actuator (or, a torque actuator) outside of FIG. 1, according to, for example, a target engine torque command from integrated controller 6. The target engine torque command is derived from integrated controller 6 which receives an accelerator opening (degree) AP from accelerator opening sensor 7 and engine speed Ne from engine speed sensor 9.

Motor controller 2 outputs a command which independently controls each of the operating point of first motor/generator MG1 (i.e., a first motor/generator rotation speed N1 and a first motor/generator torque T1) and the operating point of second motor/generator MG2 (i.e., a second motor/generator rotation speed N2 and a second motor/generator torque T2), to inverter 3 (or, a torque actuator), according to a target motor/generator (MG) torque command from integrated controller 6. The target MG torque command is derived from integrated controller 6 which receives first motor/generator rotation speed N1 from first motor/generator speed sensor 10 using a resolver and second motor/generator rotation speed N2 from second motor/generator speed sensor 11 using a resolver. In addition, this motor controller 2 outputs an information on battery S.O.C (i.e., state of charging) showing a charge status of battery 4 to integrated controller 6.

Inverter 3 is connected to each stator coil of first motor/generator MG1 and second motor/generator MG2. Inverter 3 generates independent (or, combined) 3-phase alternating current in accordance with the command derived from motor controller 2. This inverter 3 is connected with battery 4 which is discharged during operation and is charged during regeneration (e.g., regenerative action).

Hydraulic control unit 5 carries out engagement hydraulic control and disengagement hydraulic control (i.e., engagement/disengagement adjustment) of engine clutch EC and low brake LB, in accordance with hydraulic pressure commands derived from integrated controller 6. These engagement hydraulic control and disengagement hydraulic control include a partial engagement clutch control (i.e., slip friction clutch control) such as a slip engagement control or a slip disengagement control.

Integrated controller 6 receives accelerator opening AP derived from accelerator opening sensor 7, a vehicle speed (or, velocity) VSP derived from vehicle speed sensor 8, engine speed Ne derived from engine speed sensor 9, first motor/generator rotation speed N1 derived from first motor/generator rotation speed sensor 10, second motor/generator rotation speed N2 derived from second motor/generator rotation speed sensor 11, an engine input rotation speed ω in derived from second ring gear rotation speed sensor 12, an information of wheel rotation speed derived from wheel speed sensor 13, and so on. Then, integrated controller 6 carries out a predetermined processing, and outputs control commands in accordance with the result of the processing to engine controller 1, motor controller 2, and hydraulic control unit 5.

Integrated controller 6 and engine controller 1 are connected with each other by a two-way communication line 14 for information interchange. Integrated controller 6 and motor controller 2 are also connected with each other by a two-way communication line 15 for information interchange.

Next, running modes of a hybrid vehicle will now be explained. The hybrid vehicle (or, hybrid transmission TM) according to the present invention has four running modes of an electric-vehicle continuously-shift mode (i.e. variable speed ratio mode, or electric-vehicle infinitely-variable transmission mode) which is hereinafter also called "EV mode", an electric-vehicle fixed-shift mode (i.e. fixed speed ratio mode, or electric-vehicle fixed transmission mode) which is hereinafter also called "EV-LB mode", a hybrid-vehicle fixed-shift mode (i.e. fixed speed ratio mode, or hybrid-vehicle fixed transmission mode) which is hereinafter also called "LB mode", and a hybrid-vehicle continuously-shift mode (i.e. variable speed ratio mode, or hybrid-vehicle infinitely-variable transmission mode) which is hereinafter also called "E-iVT mode".

Figure 2A:
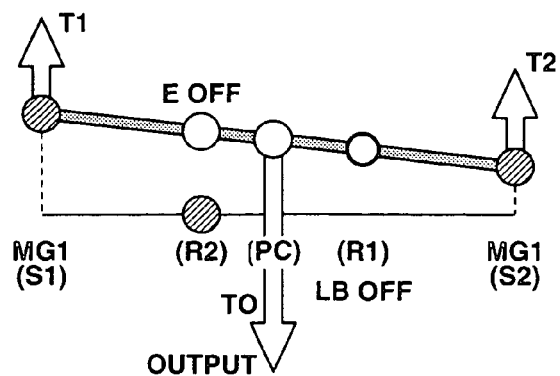
FIGS. 2A through 2D are alignment charts representing respective running modes by a Ravigneaux-type planetary gear train employed in the hybrid vehicle to which the motor torque control apparatus is applied.

The EV mode is a continuously shift (i.e., variable speed ratio) mode in which the vehicle runs by using only two motor/generators of first motor/generator MG1 and second motor/generator MG2, as shown in the alignment chart of FIG. 2A. In this mode, engine E is in deactivated (i.e., stopped) state, and engine clutch EC is disengaged (i.e., open). The straight lever of the alignment chart in FIG. 2A can freely move (i.e., can move even vertically in parallel) in accordance with rotation torques of first motor/generator MG1, second motor/generator MG2 and the output (OG), in two degrees of freedom later explained in detail. Hence, in the EV mode, the speed ratio can be varied accordingly.

Figure 2B:
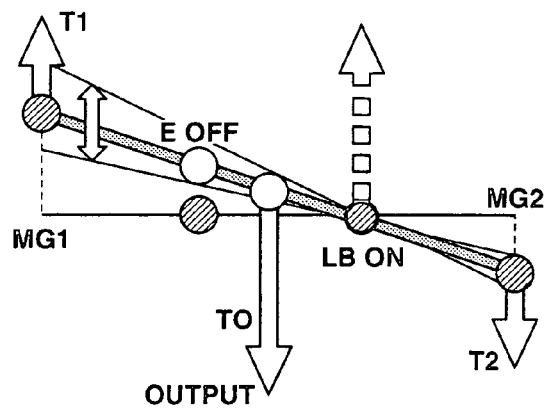

The EV-LB mode is a fixed shift (i.e., fixed speed ratio) mode in which the vehicle runs by using only two motor/generators of first motor/generator MG1 and second motor/generator MG2 with low brake LB engaged, as shown in the alignment chart of FIG. 2B. In this mode, engine E is in deactivated or stopped state, and engine clutch EC is disengaged. The straight lever of FIG. 2B rotates on a pivot of (0 rotation speed of) low brake LB, as shown by double-headed arrow in accordance with rotation torques of first motor/generator MG1 second motor/generator MG2 and the output (OG), in one degree of freedom later explained in detail. Hence, in the EV-LB mode, the speed ratio is constant. Moreover, both reduction (speed) ratio of first motor/generator MG1 to the output and reduction (speed) ratio of second motor/generator MG2 to the output are high. Hence, in this mode, relatively large driving force can be produced on the output.

Figure 2C:
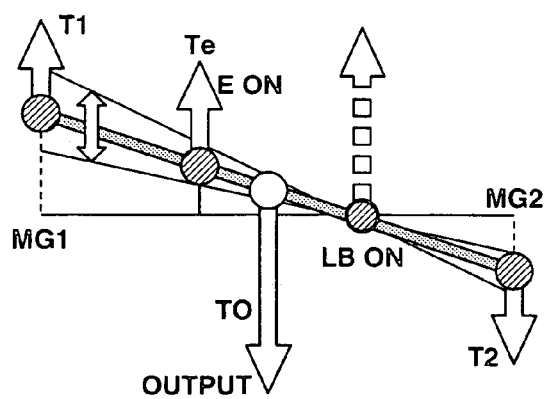

The LB mode is a fixed shift (i.e., fixed speed ratio) mode in which the vehicle runs by using engine E and two motor/generators of first motor/generator MG1 and second motor/generator MG2, with low brake LB engaged, as shown in the alignment chart of FIG. 2C. In this mode, engine E is in operation (i.e., in activated state), and engine clutch EC is engaged (i.e., closed). The straight lever of the alignment chart FIG. 2C rotates on the pivot of (0 rotation speed of) low brake LB, as shown by double-headed arrow in accordance with rotation torques of first motor/generator MG1, second motor/generator MG2, engine E and the output (OG), in one degree of freedom. Hence, in the LB mode, the speed ratio is constant. Moreover, reduction ratios of first motor/generator MG1, second motor/generator MG2, and engine E, to the output are high. Hence, in this mode, relatively large driving force can be produced on the output.

Figure 2D:
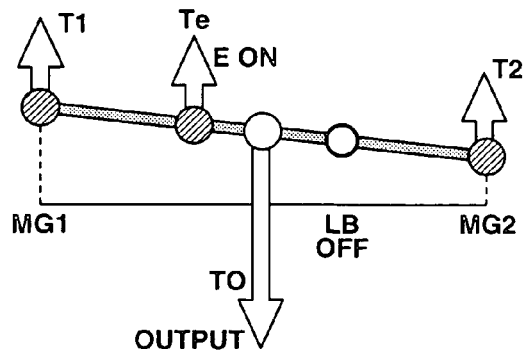

The E-iVT mode is a continuously shift (i.e., variable speed ratio) mode in which the vehicle runs by using engine E and two motor/generators of first motor/generator MG1 and second motor/generator MG2, as shown in the alignment chart of FIG. 2D. In this mode, engine E is in operation, and engine clutch EC is engaged. The straight lever of the alignment chart in FIG. 2D can freely move in accordance with rotation torques of first motor/generator MG1, second motor/generator MG2, engine E and the output (OG), in two degrees of freedom. Hence, in the E-iVT mode, the speed ratio can be varied accordingly.

Figure 3:
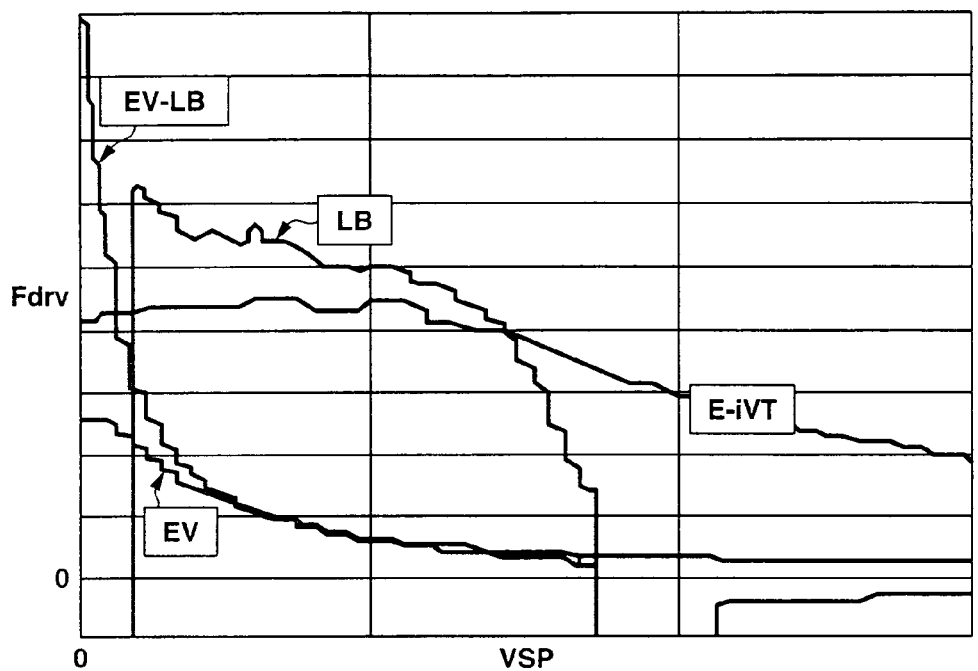
FIG. 3 is a diagram representing an example of running mode map in the hybrid vehicle to which the motor torque control apparatus is applied.
Figure 4:
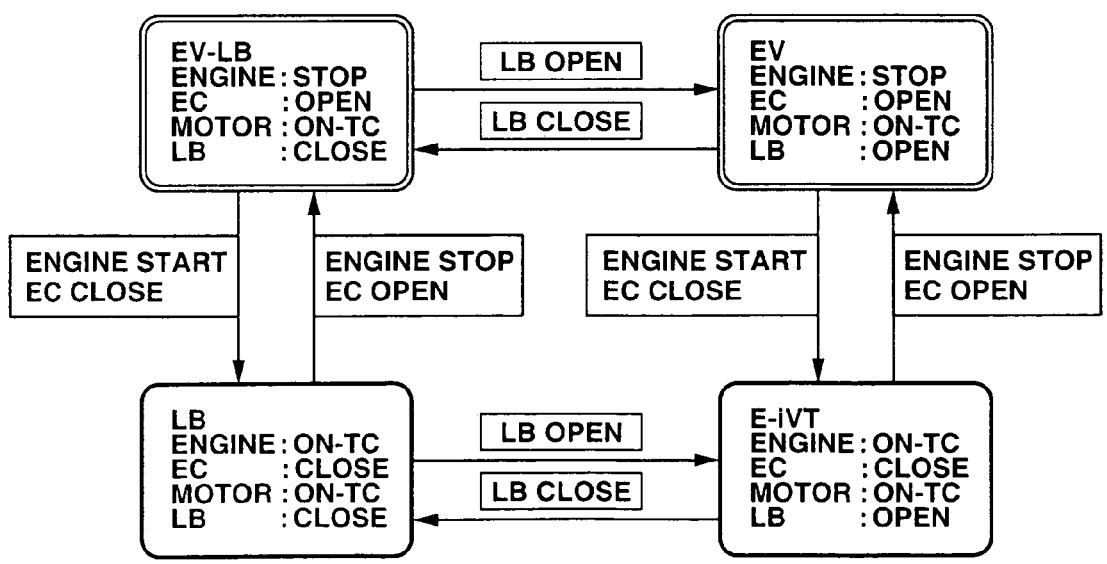
FIG. 4 is a diagram representing a mode transition path between four running modes in the hybrid vehicle to which the motor torque control apparatus is applied.

Integrated controller 6 performs a control of mode transition (or, change) between the above-described four running modes. Namely, integrated controller 6 has a running mode map in which the above-described four running modes was assigned in a three-dimensional space formed by a desired (or, target) driving force Fdrv (determined according to accelerator opening AP), vehicle speed VSP, and the battery S.O.C, as shown in FIG. 3. When the vehicle is running, or when the vehicle comes to stop, integrated controller 6 searches the running mode map in accordance with detected desired driving force Fdrv, detected vehicle speed VSP, and detected battery S.O.C. Then, integrated controller 6 selects an appropriate running mode in accordance with the charge status of battery 4 or a vehicle operating point which is determined by desired driving force Fdrv and vehicle speed VSP. In addition, FIG. 3 is one example of the running mode map shown in two-dimension formed by desired driving force Fdrv and vehicle speed VSP, by cutting the three-dimensional running mode map at a some point of a region in which the battery S.O.C is sufficient When a mode transition between EV mode and EV-LB mode, which is caused by the selection from the running mode map, is carried out, low brake LB is engaged or disengaged (or, opens or closes) as shown in FIG. 4. When a mode transition between E-iVT mode and LB mode is carried out, low brake LB is engaged or disengaged as shown in FIG. 4. Moreover, when a mode transition between EV mode and E-iVT mode is carried out, engine E starts or stops (i.e., is shut down) and at that time engine clutch EC is engaged or disengaged, as shown in FIG. 4. When a mode transition between EV-LB mode and LB mode is carried out, engine E starts or stops and at that time engine clutch EC is engaged or disengaged, as shown in FIG. 4.

A first embodiment of the motor torque control apparatus according to the present invention will now be explained with reference to FIG. 5.

In the motor torque control apparatus of the first embodiment, a disturbance observer estimates the driving force and then the estimated driving force is brought closer to a target value by way of servo control. The motor torque control apparatus of this embodiment (or, a controller composed of the disturbance observer and a motor torque control section of this embodiment) includes accelerator opening sensor 7, vehicle speed sensor 8 (corresponding to an output-shaft rotation speed sensing section (or, means)), a disturbance estimating section (or, means) 61, a driving force control section (or, means) 62, a disturbance cancellation quantity calculating section (or, means) 63, and a target motor torque calculating section (or, means) 64.

Vehicle speed sensor 8 senses an output-shaft (or, output-axis) rotation speed of hybrid transmission (i.e., driving force merging transmission) TM, and outputs information of the output-shaft rotation speed to disturbance estimating section 61.

Disturbance estimating section 61 estimates a reaction (or torsional, or negative) torque from a wheel (or, tire) shaft to transmission TM as a disturbance (i.e., an outside stimuli), by receiving the output-shaft rotation speed derived from vehicle speed sensor 8 and a target motor/generator torque derived from target motor torque calculating section 64.

Driving force control section 62 regards (or, sets) the estimated disturbance derived from disturbance estimating section 61, as an estimated driving force (of the vehicle). Then, driving force control section 62 calculates or computes a driving force control torque, in such a manner that a difference (or, deviation) between the estimated driving force and a (vehicular) target driving force set according to request by a driver or some system becomes smaller. Namely, driving force control section 62 adjusts the driving force control torque so as to bring the estimated driving force closer to the target driving force, in other words, so that the estimated driving force becomes or approaches the target driving force. In addition, the target driving force is generated or determined on the basis of the accelerator opening, the vehicle speed (the output-shaft rotation speed), and the battery S.O.C, by a target value generating section (i.e., a superior controller).

Disturbance cancellation quantity calculating section 63 receives the estimated disturbance from disturbance estimating section 61. Then, disturbance cancellation quantity calculating section 63 regards (or, sets) the reversely signed value of the estimated disturbance (i.e., a value having same absolute value and the opposite sign to the estimated disturbance), as a disturbance cancellation torque for limiting a resonance of the wheel shaft (drive shaft).

Target motor torque calculating section 64 calculates a target motor torque in accordance with the sum of the disturbance cancellation torque derived from disturbance cancellation quantity calculating section 63 and the driving force control torque derived from driving force control section 62. Then, target motor torque calculating section 64 outputs the target motor torque(s) to corresponding motor/generators MG1 and MG2.

Next, operations of this embodiment will now be explained.

[Driving Force Control and Speed Ratio Control]

Hybrid transmission TM according to this embodiment includes Ravigneaux-type planetary gear train PGR, low brake LB, and engine clutch EC as described above. Hence, the characteristic of hybrid transmission TM changes in accordance with states of low brake LB and engine clutch EC, as follows.

(a) Change of the State of Engine Clutch EC

When engine clutch EC is engaged (i.e., in engaged state), a crank shaft of engine E is integrated with second ring gear R2.

(1) Change of Moment of Inertia

When engine clutch EC is engaged (i.e., in engaged state), moment of inertia of second ring gear R2 and moment of inertia of a rotating part of engine E can be integrated (or, gathered) into second ring gear R2 in a modeling approach. When engine clutch EC is open (including, is slipping), the moment of inertia of second ring gear R2 does not include the moment of inertia of the rotating part of engine E.

(2) Change of Torque to be Transmitted to Second Ring Gear R2

When engine clutch EC is engaged (i.e., in engaged state), the engine toque is transmitted to second ring gear R2. When engine clutch EC is open (including, is slipping), a clutch-frictional torque is transmitted to second ring gear R2.

(b) Change of the State of Low Brake LB

The rotation system of Ravigneaux-type planetary gear train PGR has 2 degrees of freedom. Namely, in 2 degrees of freedom, when two rotation speeds among power sources and output members are determined, all the remaining rotation speeds are accordingly determined. However, when low brake LB is engaged (i.e., in engaged state), the rotation system of Ravigneaux-type planetary gear train PGR has single degree of freedom.

(1) Change of Shift Characteristic

When low brake LB is engaged (i.e., in engaged state), a speed ratio (a ratio between an input rotation speed and an output rotation speed) is fixed at some (predetermined) value. When low brake LB is open (including, is slipping), the speed ratio is determined in accordance with each rotation speed of the corresponding rotation member, hence the continuously (i.e., infinitely) speed ratio (or, shift) control can be achieved.

Therefore, the motor torque control according to the present invention is switched in accordance with a state of hybrid transmission TM in conformity with the state of low brake LB, as follows. When low brake LB is engaged (i.e., in closed state), the motor torque control according to the present invention performs only the driving force control (in the first embodiment). When low brake LB is open (including, is slipping), the motor torque control according to the present invention performs both of the driving force control and the speed ratio control (in a second embodiment).

[Concepts of the Motor Torque Control According to the Present Invention (the First and Second Embodiments)]

At first, a plant model in the case where a torsion of the drive shaft (wheel shaft) is taken into consideration, is expressed in the following equations.

$$d\omega o/dt = -(b21k/if)\theta + u \quad (1)$$

$$Iv \cdot d\omega t/dt = k\theta + T_R \quad (2)$$

$$d\theta/dt = (\omega o/if) - \omega t \quad (3)$$

where, ωo denotes an output shaft rotation speed, ωt denotes the wheel (or, tire) rotation speed, θ denotes a torsional angle (or, angle of torsion) of the drive shaft, $T_R$ denotes a running resistance torque (i.e., resistance torque in running), k denotes a torsional rigidity (or, rigidity of torsion) of the drive shaft, Iv denotes an inertia of the vehicle, if denotes the ratio of a final gear, b21 denotes a constant determined according to the moment of inertia of hybrid transmission TM (hereinafter, transmission TM is also called the unit), and u denotes a torque for the motor/generator(s).

A dynamic characteristic of the output shaft (or, axis) rotation speed shown in equation (1), namely dynamics according to only hybrid transmission TM, is handled as a nominal plant, as shown in FIG. 6. Then, dynamic characteristics of the drive shaft's torsion shown in equation (3) and of the wheel rotation speed shown in equation (2), namely dynamics according to the region from the drive shaft toward a driven system side (i.e., to the wheel), are handled as unmodeled (not-modeled) dynamics. A torsional torque (i.e., torque of torsion) of the drive shaft is handled as a disturbance to(against) the nominal plant. The disturbance, namely the torsional torque of the drive shaft is estimated by means of a disturbance observer based on the nominal plant. The torsional (or, reaction) torque of the drive shaft is equivalent to the driving force. Hence, a servo system of driving force is composed, in such a manner that the difference between the target driving force and the estimated torsional torque of the drive shaft becomes equal to zero (or, becomes smaller). Moreover, the resonance of the drive shaft can be suppressed, by generating torque according to the estimated disturbance so as to cancel (a torsion-affected part of) the torsional torque of the drive shaft, by the motor(s).

FIG. 7 is a block diagram showing the motor torque control system shown in FIG. 6. "The dynamic characteristic of the wheel" and "the nominal plant" are shown in the right side's portion indicated by a broken line in FIG. 7. "The dynamic characteristic of the wheel" receives output shaft rotation speed ωo and running resistance torque $T_R$. Moreover, "the dynamic characteristic of the wheel" outputs an output shaft torque To (i.e., torque of the output shaft) to (or, against) a road surface from the wheel(s) (or, the tire). Moreover, "the dynamic characteristic of the wheel" outputs the drive shaft's torsional torque d according to a wheel torque (or, a tire torque) Tt (=output shaft torque To) and final gear ratio if, to an adder of the nominal plant. "The nominal plant" includes the adder which adds motor torque u derived from the input side, to drive shaft's torsional torque d derived from the output side; and an integrator which integrates the added total torque and outputs output shaft rotation speed wo to the disturbance observer.

"The disturbance observer", "a driving force control system of the motor torque", and "a vibration control system of the motor torque" are shown in the left side's portion indicated by a broken line in FIG. 7. "The disturbance observer" receives output shaft rotation speed ωo from the nominal plant, and motor torque u. Then, "the disturbance observer" calculates estimated torsional torque d^ (=estimated driving force) on the basis of a state observation, and outputs estimated torsional torque d^ to the motor torque's driving force control system. In addition, "the disturbance observer" outputs estimated torsional torque d^ to the motor torque's vibration control system, as a disturbance cancellation torque u1. "The motor torque's driving force control system" calculates an estimated output shaft torque T^o (=an estimated wheel (or, tire) torque T^t) on the basis of estimated torsional torque d^ derived from the disturbance observer. Then, "the motor torque's driving force control system" calculates the torque difference between a target output shaft torque T*o and estimated output shaft torque T^o by subtracting estimated output shaft torque T^o from target output shaft torque T*o, and outputs a target motor torque u2 by carrying out PI control (i.e., proportional and integral control) on the basis of this torque difference. "The motor torque's vibration control system" calculates motor torque u by subtracting disturbance cancellation torque u1 from target motor torque u2.

Here, "the disturbance observer", "the motor torque's driving force control system", and "the motor torque's vibration control system" can be represented by the following equations.

Disturbance observer $$dd^{\wedge}/dt = h2(\omega o - \omega^{\wedge} o)$$

$$d\omega^{\wedge}o/dt = d^{\wedge} + h1(\omega o - \omega^{\wedge} o) + u$$

wherein, h1 and h2 denote observer gains, and ω^o denotes a target rotation speed of the output shaft.

Motor torque's driving force control system $$u2 = Kp\{1 + (kI/s)\}\{T^*o - (d^{\wedge}/b_{21})\}$$

$$= Kp\{1 + (kI/s)\}\{T^*o - T^{\wedge}o\}$$

Motor torque's vibration control system $$u = -u1 + u2$$

$$u1 = d^{\wedge}$$

[Operations and Advantages of the Motor Torque Control]

In the motor torque control apparatus for a hybrid vehicle according to the first embodiment, in the case of "EV-LB mode" or "LB mode" in which low brake LB is engaged, the disturbance observer estimates the driving force. Then, a desired acceleration/deceleration of the vehicle is achieved by servo-controlling this estimated driving force to a target driving force, without using a sensor for sensing the driving force and without the influence of, e.g., inertias of the drive system (or, drive train) during transient time of the acceleration or deceleration of the vehicle (i.e., while the vehicle is being accelerated or decelerated).

Namely, disturbance estimating section 61 receives the output shaft rotation speed from vehicle speed sensor 8 and the target motor torque from target motor torque calculating section 64, and then estimates the reaction torque from the wheel shaft (drive shaft) to transmission TM as the disturbance. Next, driving force control section 62 recognizes the estimated disturbance derived from disturbance estimating section 61 as the estimated driving force, and calculates the driving force control torque so as to bring the estimated driving force closer to the target driving force set on the basis of the accelerator opening, the vehicle speed, and the battery S.O.C. Next, target motor torque calculating section 64 calculates the target motor torque which is outputted to motor controller 2 for motor/generator MG1 or MG2, in accordance with the driving force control torque derived from driving force control section 62.

Thus, the driving force is estimated by the disturbance observer, and the estimated driving force is so controlled as to accord with the target value by the servo control. Namely, the disturbance observer is composed, which regards the drive shaft's torsional torque due to reaction torque from the wheel shaft to the transmission, as the disturbance of the dynamic characteristic of the output shaft. Then, the drive shaft's torsional torque is estimated by using this disturbance observer and some given information. Moreover, the drive shaft's torsional torque is equivalent to driving force. Hence, a feedback control which reduces the difference between the target driving force and the estimated driving force (=the estimated torsional torque of the drive shaft) can be introduced. Therefore, the target motor torque is calculated by means of the PI control.

In the case where the target motor torque (corresponding to the target driving force) is calculated by means of a feedforward control as mentioned above in the previously proposed technique, inertias of drive system (or, drive train) are used for acceleration or deceleration of the vehicle, during transient time of the acceleration or deceleration of the vehicle. Due to this, there is a problem that the target driving force deviates from the actual (or, real) driving force, hence the desired acceleration or deceleration of the vehicle cannot be achieved. However, the motor torque control according to this embodiment also resolves such a problem.

Moreover, in the first embodiment, disturbance cancellation quantity calculating section 63 receives the estimated disturbance from disturbance estimating section 61. Then, disturbance cancellation quantity calculating section 63 regards the reversely signed value of the estimated disturbance as the disturbance cancellation torque for suppressing or quelling a resonance of the wheel shaft. Target motor torque calculating section 64 calculates the target motor torque in accordance with the sum of the disturbance cancellation torque derived from disturbance cancellation quantity calculating section 63 and the driving force control torque derived from driving force control section 62. Then, target motor torque calculating section 64 outputs the target motor torque(s) to corresponding motor/generators MG1 and MG2.

Therefore, the deviation of the actual driving force from the target driving force can be suppressed without using a sensor for sensing the driving force. Moreover, the resonance of the drive shaft can also be suppressed by canceling the reaction torque (which acts) to the transmission from the wheel shaft, by the motor torque.

In addition, for example, in a technique as described in a Japanese Patent application publication No. S61(1986)-5318 published on Jan. 11, 1986, rotation sensors detect rotation speeds of both ends of a shaft. Then, vibration of the shaft is electronically attenuated in accordance with the detected relative speed or relative angle between both ends of the shaft. In contrast, in the first embodiment according to the present invention, the information of drive shaft's torsional torque estimated by the disturbance observer is used. Hence, cost increase due to installation of such a rotation sensor(s) for limiting the vibration, can be avoided.

In addition, some configurations and advantages according to the motor torque control apparatus of the first embodiment will now be explained.

The motor torque control apparatus for an automotive vehicle, including: transmission TM which has either one of fixed speed ratio and variable speed ratio; at least one motor/generator coupled with transmission TM as the propelling power source of the vehicle; and the controller configured to be electrically connected to the motor/generator for motor torque control. Moreover, this controller includes the disturbance observer that estimates the driving force; and the motor torque control section that controls the driving force estimated by the disturbance observer, to bring the estimated driving force closer to the target driving force by way of servo control. Hence, a desired acceleration/deceleration of the vehicle can be achieved without using a sensor for sensing the driving force and without the influence of, e.g., inertias of the drive system during transient time of the acceleration or deceleration of the vehicle.

The above-described controller includes output-shaft rotation speed sensing section 8 configured to sense rotation speed of the output shaft of transmission TM; disturbance estimating section 61 configured to estimate the reaction torque from the wheel shaft to the transmission as the disturbance, by receiving the output shaft's rotation speed and the target motor torque; driving force control section 62 configured to regard the estimated disturbance as the estimated driving force, and configured to calculate the driving force control torque so as to bring the estimated driving force closer to the target driving force set according to request by a driver or some system; and target motor torque calculating section 64 configured to calculate the target motor torque for the motor/generator, in accordance with the driving force control torque. Hence, the difference between the target driving force and the actual driving force can be suppressed without using a sensor for sensing the driving force.

The above-described controller further comprises disturbance cancellation quantity calculating section 63 configured to regard the reversely signed value of the estimated disturbance, as the disturbance cancellation torque suppressing the resonance of the wheel shaft; and target motor torque calculating section 64 is configured to calculate the target motor torque in accordance with the sum of the disturbance cancellation torque and the driving force control torque. Hence, the difference between the target driving force and the actual driving force can be suppressed without using a sensor for sensing the driving force. Moreover, the resonance of the drive shaft can also be suppressed without cost increase, by the use of the estimated disturbance.

A second embodiment of the motor torque control apparatus according to the present invention will now be explained with reference to FIG. 8.

The second embodiment is an example which performs the speed ratio control and the driving force control (motor torque control), in the case of "EV mode" or "E-iVT mode" where low brake LB is open.

Namely, in the motor torque control apparatus of the second embodiment, the disturbance observer estimates the driving force, and then the driving force control torque is so calculated as to eliminate the difference between the estimated driving force and a target value (target driving force). Moreover, a shift (or, speed ratio) control torque is so calculated as to reduce the difference between an actual speed ratio and a target speed ratio. The motor torque is controlled or adjusted, in such a manner that this driving force control torque is only used for variation in acceleration/deceleration of the output shaft's rotation, and this shift control torque is only used for a shift controlled variable (i.e. a variable to be controlled). The motor torque control apparatus of this embodiment (or, the controller composed of the disturbance observer and the motor torque control section in this embodiment) includes accelerator opening sensor 7, vehicle speed sensor 8 (corresponding to a rotation speed sensing section (or, means)), first motor/generator (rotation) speed sensor 10 (corresponding to the rotation speed sensing section (or, means)), second motor/generator (rotation) speed sensor 11 (corresponding to the rotation speed sensing section (or, means)), second ring gear rotation speed sensor 12 (corresponding to the rotation speed sensing section (or, means)), disturbance estimating section (or, means) 61, driving force control section (or, means) 62, disturbance cancellation quantity calculating section (or, means) 63, target motor torque calculating section (or, means) 64, and a shift (or, speed ratio) control section (or, means) 65, as shown in FIG. 8.

Vehicle speed sensor 8 senses an output-shaft rotation speed of hybrid transmission TM, and outputs information of the output-shaft rotation speed to disturbance estimating section 61.

Each of first motor/generator speed sensor 10, second motor/generator speed sensor 11, and second ring gear rotation speed sensor 12 outputs rotation speed information of the corresponding power source (or, drive source), as the shift controlled variable, to shift control section 65.

Shift control section 65 recognizes (or, sets) some one of rotation speeds of the power sources as the shift controlled variable (or, shift controlling variable). A ratio between the shift controlled variable and the output-shaft rotation speed is defined as the speed ratio. Then, shift control section 65 calculates the shift control torque so as to decrease the difference between the defined (actual) speed ratio and the target speed ratio. Namely, shift control section 65 adjusts the shift control torque to decrease the difference between the actual speed ratio and the target speed ratio. Additionally, "the target speed ratio" is determined or calculated in accordance with a ratio between the output-shaft rotation speed and a target input rotation speed which is produced, for example, by a target value producing section which is the superior controller.

Disturbance estimating section 61 estimates the reaction torque from the wheel shaft to transmission TM as the disturbance, by receiving the output-shaft rotation speed derived from vehicle speed sensor 8 and the target motor torque derived from target motor torque calculating section 64, in the same manner as the first embodiment.

Driving force control section 62 recognizes the estimated disturbance derived from disturbance estimating section 61, as the estimated driving force. Then, driving force control section 62 calculates the driving force control torque, in such a manner that a difference between the estimated driving force and the target driving force set according to request by the driver or some system becomes smaller. Namely, driving force control section 62 adjusts the driving force control torque so that the estimated driving force is brought closer to the target driving force, in the same manner as the first embodiment.

Disturbance cancellation quantity calculating section 63 receives the estimated disturbance from disturbance estimating section 61. Then, disturbance cancellation quantity calculating section 63 regards the reversely signed value of the estimated disturbance (i.e., a value having same absolute value and the opposite sign to the estimated disturbance), as the disturbance cancellation torque for limiting or suppressing the resonance of the wheel shaft, in the same manner as the first embodiment.

Target motor torque calculating section 64 calculates the target motor torque, in such a manner that the sum of the disturbance cancellation torque derived from disturbance cancellation quantity calculating section 63 and the driving force control torque derived from driving force control section 62 only acts on variation in acceleration(/deceleration) of the output shaft's rotation, and the shift control torque only acts on the shift controlled variable. Then, target motor torque calculating section 64 outputs the target motor torque(s) to corresponding motor/generators MG1 and MG2.

Next, operations and advantages of this embodiment will now be explained.

[Operations and Advantages of the Motor Torque Control]

In the motor torque control apparatus for a hybrid vehicle according to the second embodiment, in "EV mode" or "E-iVT mode" where low brake LB is open, the disturbance observer estimates the driving force. Then, the driving force control torque is so calculated as to eliminate the difference between the estimated driving force and a target value (target driving force). Moreover, the shift (or, speed ratio) control torque is so calculated as to reduce the difference between the actual speed ratio and a target speed ratio. Then, the motor torque is controlled or adjusted, in such a manner that this driving force control torque is only used to vary acceleration(/deceleration) of the output shaft's rotation, and this shift control torque is only used for (change of) the shift controlled variable. Thus, a desired acceleration/deceleration of the vehicle is achieved without using a sensor for sensing the driving force and without the influence of, e.g., inertias of the drive system (or, drive train) during transient time of the acceleration or deceleration of the vehicle.

Namely, shift control section 65 recognizes (or, regards) any one of rotation speeds of the power sources as the shift controlled variable. The ratio between the shift controlled variable and the output-shaft rotation speed is defined as the speed ratio. Then, shift control section 65 calculates the shift control torque so as to decrease the difference between the speed ratio and the target speed ratio. Disturbance estimating section 61 receives the output shaft rotation speed from vehicle speed sensor 8 and the target motor torque from target motor torque calculating section 64, and then estimates the reaction torque from the wheel (or, tire) shaft to transmission TM, as the disturbance. Next, driving force control section 62 recognizes the estimated disturbance derived from disturbance estimating section 61 as the estimated driving force, and calculates the driving force control torque so as to bring the estimated driving force closer to the target driving force set on the basis of the accelerator opening, the vehicle speed, and the battery S.O.C. Next, target motor torque calculating section 64 calculates the target motor torque (value) which is outputted to motor/generator MG1 and MG2, in such a manner that the driving force control torque derived from driving force control section 62 only acts on variation(s) of acceleration of the output shaft's rotation, and the shift control torque only acts on (variation of) the shift controlled variable.

Thus, the target motor torque(s) which is outputted to motor/generator MG1 and MG2 is calculated, in such a manner that the driving force control torque only acts on variation in acceleration of the output shaft's rotation and the shift control torque only acts on (variation of) the shift controlled variable (=input rotation speed). Namely, the target motor torque is determined by independently taking two of the driving force control torque and the shift control torque into consideration. Regarding the driving force control torque, in the same manner as the first embodiment, the target motor torque is calculated in such a manner that the variation in acceleration of the output shaft's rotation is adjusted by the feedback control eliminating the difference between the target driving force and the estimated driving force. Regarding the shift control torque, the target motor torque is calculated in such a manner that the shift controlled variable is adjusted by the feedback control conforming the actual speed ratio to the target speed ratio.

As a result, in the running condition where Ravigneaux-type planetary gear train PGR is in "EV mode" or "E-iVT mode" which is in 2 degrees of freedom and also called continuous speed ratio mode, the motor torque control which compensates variation of the speed ratio is performed. On the other hand, in the case where the target motor torque (corresponding to the target driving force) is calculated by means of the feedforward control as mentioned above in the previously proposed technique, inertias of drive system are used for acceleration or deceleration of the vehicle, during transient time of the acceleration or deceleration of the vehicle. Due to this, there is a possibility that the target driving force deviates from the actual driving force, hence the desired acceleration or deceleration of the vehicle cannot be achieved. However, the motor torque control according to this embodiment also resolves such a problem.

Moreover, in the second embodiment, in the similar manner as the first embodiment, disturbance cancellation quantity calculating section 63 receives the estimated disturbance from disturbance estimating section 61. Then, disturbance cancellation quantity calculating section 63 regards the reversely signed value of the estimated disturbance as the disturbance cancellation torque for suppressing the resonance of the wheel shaft. Target motor torque calculating section 64 calculates the target motor torque so that the sum of the disturbance cancellation torque derived from disturbance cancellation quantity calculating section 63 and the driving force control torque derived from driving force control section 62 is used only for variation of acceleration of the output shaft's rotation. Then, target motor torque calculating section 64 outputs the target motor torque (s) to corresponding motor/generators MG1 and MG2.

Therefore, in the same manner as the first embodiment, the deviation of the actual driving force from the target driving force can be suppressed without using a sensor for sensing the driving force. Moreover, the resonance of the drive shaft can also be suppressed by canceling the reaction torque (which acts) to the transmission from the wheel shaft, by the motor torque. Furthermore, cost increase due to installation of a rotation sensor(s) for suppressing the vibration, can be avoided.

In addition, some configurations and advantages of the motor torque control apparatus according to the first and second embodiments will now be explained.

The above-described motor torque control apparatus for the hybrid vehicle which has at least two motor/generators as power sources and which runs by transmitting the power to the wheel through the transmission including the differential gear having two-degrees-of-freedom in that when any two rotation speeds among power sources and output members of the differential gear are determined, all the remaining rotation speeds are accordingly determined; includes the controller configured to control motor torque in such a manner that the driving force control torque calculated so as to bring the estimated driving force closer to the target driving force is only used for variation in rotational acceleration of the output shaft, and the shift control torque calculated so as to reduce the difference between the actual speed ratio and the target speed ratio is only used for the shift controlled variable. Hence, a desired acceleration/deceleration of the vehicle can be achieved without using a sensor for sensing the driving force and without the influence of, e.g., inertias of the drive system during transient time of the acceleration or deceleration of the vehicle.

The above-described controller includes: rotation speed sensing section(s) 8, 10, 11, 12 configured to sense rotation speed of the output shaft and any one of rotation speeds of the power sources; shift control section 65 configured to regard the sensed rotation speed of the power source as the shift controlled variable, and configured to calculate the shift control torque so as to reduce the difference between the target speed ratio and the speed ratio defined by a ratio between the shift controlled variable and the output shaft's rotation speed; disturbance estimating section 61 configured to estimate the reaction torque from the wheel shaft to the transmission as the disturbance, by receiving the output shaft's rotation speed and the target motor torque; driving force control section 62 configured to regard the estimated disturbance as the estimated driving force, and configured to calculate the driving force control torque so as to reduce or eliminate the difference between the estimated driving force and the target driving force set according to request by a driver or some system; and target motor torque calculating section 64 configured to calculate the target motor torque which is outputted to the motor/generator, in such a manner that the driving force control torque is only used for variation in rotational acceleration of the output shaft and the shift control torque is only used for the shift controlled variable. Hence, the difference between the target driving force and the actual driving force can be suppressed without using a sensor for sensing the driving force.

The above-described controller further includes disturbance cancellation quantity calculating section 63 configured to regard the reversely signed value of the estimated disturbance, as the disturbance cancellation torque suppressing the resonance of the wheel shaft; and target motor torque calculating section 64 is configured to calculate the target motor torque in such a manner that the sum of the disturbance cancellation torque and the driving force control torque is only used for variation in rotational acceleration of the output shaft, and the shift control torque is only used for the shift controlled variable. Hence, the difference between the target driving force and the actual driving force can be suppressed without using a sensor for sensing the driving force. Moreover, the resonance of the drive shaft can also be suppressed without cost increase, by use of the estimated disturbance.

The above-described motor torque control apparatus includes engine E, first motor/generator MG1, and second motor/generator MG2 as power sources, and the transmission is hybrid transmission TM including: the differential gear coupled with engine E, output gear OG toward (driven side part of) the drive system of the vehicle, first motor/generator MG1, and second motor/generator MG2 in such a way that two input/output members of engine E and output gear OG are respectively arrayed inwardly on the differential gear's alignment chart on which at least four input/output members (rotation members) can be arrayed, and in such a way that two input members of first motor/generator MG1 and the second motor/generator MG2 are respectively arrayed outwardly on the alignment chart; and low brake LB configured to change the mode of hybrid transmission TM between the variable speed ratio mode and the fixed speed ratio mode, by the engagement/disengagement control of low brake LB. Hence, in the case of "EV-LB mode" or "LB mode" where low brake LB is engaged, the motor torque control according to the first embodiment is employed; and in the case of "EV mode" or "E-iVT mode" where low brake LB is open (or, disengaged), the motor torque control according to the second embodiment is employed. Hence, in the hybrid vehicle equipped with hybrid transmission TM whose rotation elements (or, members) have changeable degree-of-freedom (i.e., degree of freedom can change in accordance with running mode change), the difference between the actual driving force and the target driving force can be suppressed without using a sensor for sensing the driving force, irrespective of the selected running mode.

In the first embodiment, the first controller includes accelerator opening sensor 7, vehicle speed sensor 8, disturbance estimating section (or, means) 61, driving force control section (or, means) 62, disturbance cancellation quantity calculating section (or, means) 63, and target motor torque calculating section (or, means) 64. However, such a concrete configuration according to the present invention is not limited to the above-described first embodiment, as long as a disturbance observer estimates driving force and the estimated driving force is servo-controlled to (become) a target value.

In the second embodiment, the second controller includes accelerator opening sensor 7, vehicle speed sensor 8, respective rotation speed sensor 10, 11, and 12, disturbance estimating section (or, means) 61, driving force control section (or, means) 62, disturbance cancellation quantity calculating section (or, means) 63, target motor torque calculating section (or, means) 64, and shift (or, speed ratio) control section (or, means) 65. However, such a concrete configuration according to the present invention is not limited to the above-described second embodiment, as long as: a disturbance observer estimates driving force; driving force control torque is calculated in such a manner that the estimated driving force is brought closer to a target value; the calculated driving force control torque is used only for variation in acceleration of the output shaft's rotation; shift control torque is calculated in such a manner the difference between an actual speed ratio and a target speed ratio is reduced; the calculated shift control torque is used only for a shift controlled variable (or, quantity); and the motor torque is controlled in accordance with the calculated driving force control torque and the calculated shift control torque.

In the above-described first and second embodiments, it has been exemplified that the motor torque control apparatus according to the present invention is applied to the hybrid vehicle equipped with an engine and two motor/generators as power sources; and a hybrid transmission including a Ravigneaux-type planetary gear train, a low brake and an engine clutch. However, the motor torque control apparatus according to the first embodiment is applicable to an electric (-powered) vehicle or a hybrid vehicle which includes at least one motor/generator as a power source and runs by transmitting the power to drive wheel(s) (or, tire) through a transmission having a constant speed ratio or variable speed ratio. Moreover, the motor torque control apparatus according to the second embodiment is applicable to an electric vehicle or a hybrid vehicle which includes at least two motor/generators as power sources and runs by transmitting the power to drive wheel(s) through a transmission having a two-degrees-of-freedom differential gear (namely, when two rotation speeds among power sources and output members are determined, all the remaining rotation speeds are accordingly determined).

Figure 9:
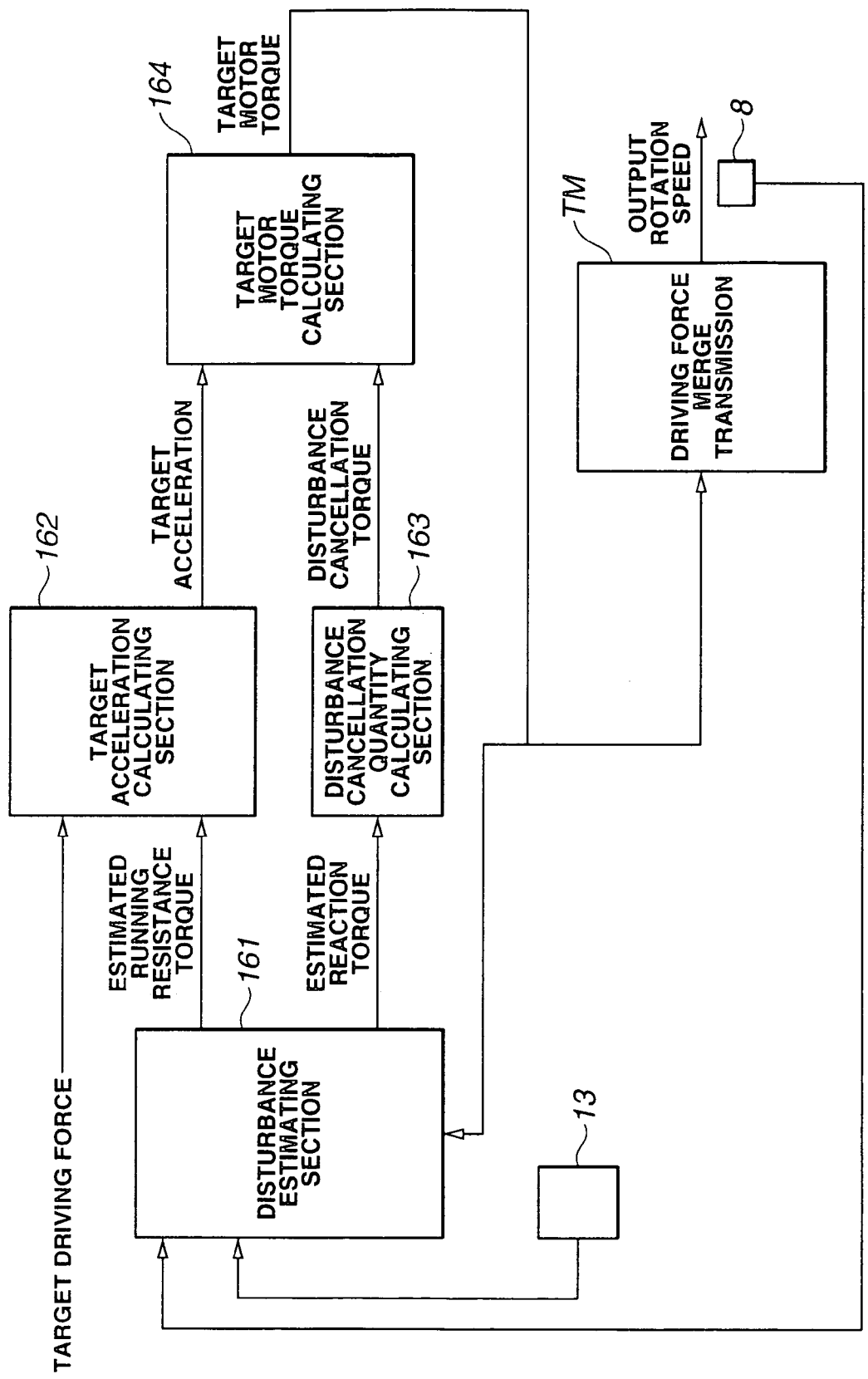
FIG. 9 is a schematic block diagram representing some elements of a motor torque control apparatus according to a third embodiment of the present invention.

A third embodiment of the motor torque control apparatus according to the present invention will now be explained with reference to FIG. 9.

In the motor torque control apparatus of the third embodiment, a disturbance observer estimates the running resistance torque (i.e., torque according to the running resistance) and the torsional torque of the drive shaft (wheel shaft), and then the target driving force is achieved by the disturbance observer. The motor torque control apparatus of this embodiment (or, the controller of the motor torque control apparatus in this embodiment) includes accelerator opening sensor 7, vehicle speed sensor 8 (corresponding to the output-shaft rotation speed sensing section (or, means)), a wheel speed sensor 13 (corresponding to a wheel rotation speed sensing section (or, means)), a disturbance estimating section (or, means) 161, a target acceleration calculating section (or, means) 162, a disturbance cancellation quantity calculating section (or, means) 163, and a target motor torque calculating section (or, means) 164.

Vehicle speed sensor 8 senses the output-shaft (or, output-axis) rotation speed of hybrid transmission TM and outputs information of the output-shaft rotation speed to disturbance estimating section 161.

Wheel speed sensor 13 senses the rotation speed of the wheel coupled with hybrid transmission TM, and outputs information of the wheel rotation speed to disturbance estimating section 161.

Disturbance estimating section 161 estimates the running resistance torque and a reaction (or, torsional) torque from the drive shaft to hybrid transmission TM (i.e., torsional torque of the drive shaft), as a disturbance, by receiving the output-shaft rotation speed derived from vehicle speed sensor 8, the wheel rotation speed derived from wheel speed sensor 13 and a target motor torque derived from target motor torque calculating section 164.

Target acceleration calculating section 162 calculates a target acceleration (i.e., time rate in speed) of the vehicle, in accordance with the target driving force (of the vehicle) set according to request by a driver or some system, and the estimated running resistance torque derived from disturbance estimating section 161. In addition, the target driving force is generated or determined on the basis of the accelerator opening, the vehicle speed (the output-shaft rotation speed), and the battery S.O.C, by the target value producing section which is the superior controller.

Disturbance cancellation quantity calculating section 163 regards (or, sets) the reversely signed value of the estimated reaction torque (i.e., a value having same absolute value and the opposite sign to the estimated reaction torque), as a disturbance cancellation torque for suppressing a resonance of the drive shaft (wheel shaft).

Target motor torque calculating section 164 regards, as the target motor torque, (or, target motor torque calculating section 164 calculates the target motor torque in accordance with) the sum of the disturbance cancellation torque derived from disturbance cancellation quantity calculating section 163 and the target acceleration derived from target acceleration calculating section 162. Then, target motor torque calculating section 164 outputs the target motor torque(s) to corresponding motor/generators MG1 or MG2.

Next, operations of this embodiment will now be explained.

[Driving Force Control and Speed Ratio Control]

Hybrid transmission TM according to this embodiment includes Ravigneaux-type planetary gear train PGR, low brake LB, and engine clutch EC as described above. Hence, the characteristic of hybrid transmission TM changes in accordance with states of low brake LB and engine clutch EC, as follows.

(a) Change of the State of Engine Clutch EC

When engine clutch EC is engaged (i.e., in engaged state), the crank shaft of engine E is integrated with second ring gear R2.

(1) Change of Moment of Inertia

When engine clutch EC is engaged (i.e., in engaged state), moment of inertia of second ring gear R2 and moment of inertia of the rotating part of engine E can be integrated (or, gathered) into second ring gear R2 in a modeling approach. When engine clutch EC is open (including, is slipping), the moment of inertia of second ring gear R2 does not include the moment of inertia of the rotating part of engine E.

(2) Change of Torque to be Transmitted to Second Ring Gear R2

When engine clutch EC is engaged (i.e., in engaged state), the engine toque is transmitted to second ring gear R2. When engine clutch EC is open (including, is slipping), a clutch-frictional torque is transmitted to second ring gear R2.

(b) Change of the State of Low Brake LB

The rotation system of Ravigneaux-type planetary gear train PGR has 2 degrees of freedom (namely, when two rotation speeds among power sources and output members are determined, all the remaining rotation speeds are accordingly determined). However, when low brake LB is engaged (i.e., in engaged state), the rotation system of Ravigneaux-type planetary gear train PGR has single degree of freedom.

(1) Change of Shift Characteristic

When low brake LB is engaged (i.e., in engaged state), the speed ratio (the ratio between an input rotation speed and an output rotation speed) is fixed at some predetermined value. When low brake LB is open (including, is slipping), the speed ratio is determined in accordance with each rotation speed of the corresponding rotation member (or, element), hence the continuously shift control can be achieved.

Therefore, the motor torque control according to the present invention is switched in accordance with a state of hybrid transmission TM in conformity with the state of low brake LB, as follows. When low brake LB is engaged (i.e., in closed state), the motor torque control according to the present invention performs only the driving force control (the third embodiment). When low brake LB is open (including, is slipping), the motor torque control according to the present invention performs both of the driving force control and the speed ratio control (a fourth embodiment).

[Concepts of the Motor Torque Control According to the Present Invention (the Third and Fourth Embodiments)]

At first, the plant model in the case where the torsion of the drive shaft is taken into consideration, is expressed in the following equations.

$$d\omega o/dt = d + u \quad (11)$$

$$d = -b21 To \quad (12)$$

$$Iv \cdot d\omega t/dt = if To + T_R \quad (13)$$

$$d\theta/dt = (\omega o/if) - \omega t \quad (14)$$

$$To = (k/if)\theta \quad (15)$$

where, $\omega o$ denotes the output shaft rotation speed, $\omega t$ denotes the wheel (or, tire) rotation speed, $\theta$ denotes the torsional angle (i.e., angle of torsion) of the drive shaft, $T_R$ denotes the running resistance torque (i.e., resistance torque in running), k denotes the torsional rigidity (i.e., rigidity of torsion) of the drive shaft, Iv denotes the inertia of the vehicle, if denotes the ratio of the final gear, b21 denotes the constant determined according to the moment of inertia of hybrid transmission TM (hereinafter, transmission TM is also called the unit), To denotes torque of the output shaft, and u denotes the torque for the motor/generator(s).

Figure 10:
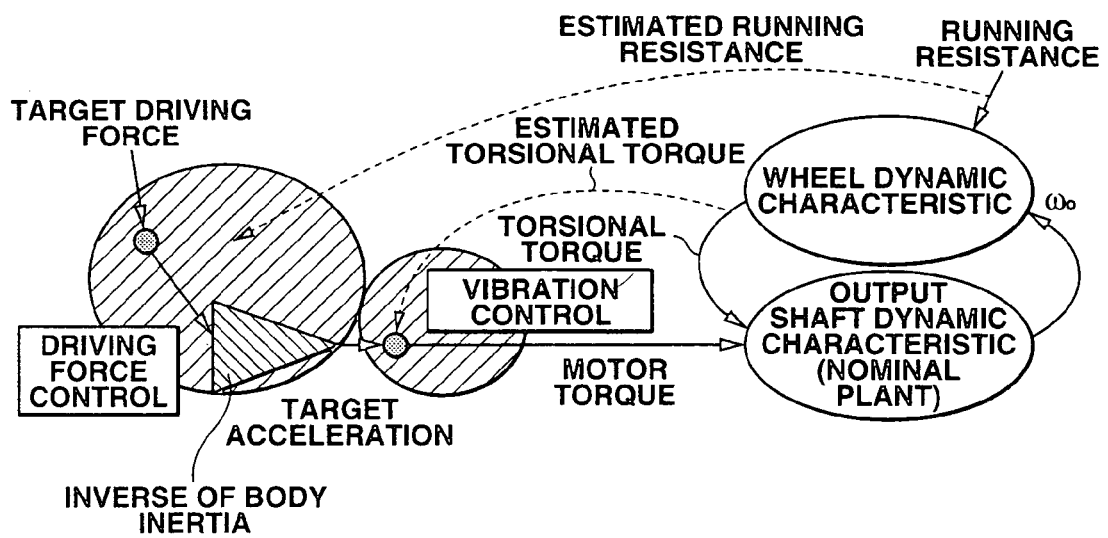
FIG. 10 is an explanatory view representing concepts of the motor torque control according to the third embodiment.

The dynamic characteristic of the output shaft (or, axis) rotation speed shown in equation (11), namely dynamics according to only hybrid transmission TM, is handled as a nominal plant, as shown in FIG. 10. Then, dynamic characteristics of the drive shaft's torsion shown in equation (14) and of the wheel rotation speed shown in equation (13), namely dynamics according to the region from the drive shaft toward the driven side (i.e., to the wheel), are handled as unmodeled (not-modeled) dynamics. The running resistance torque (or, torque of the running resistance) is handled as a disturbance to the dynamic characteristic of the wheel, and the torsional torque (or, torque of torsion) of the drive shaft is handled as a disturbance against the nominal plant.

The disturbance $d\hat{}$, namely the torsional torque of the drive shaft (hereinafter also called, drive-shaft torsional-torque disturbance $d\hat{}$ or estimated drive-shaft torsional-torque $d\hat{}$) and the disturbance $T_R\hat{}$, namely the running resistance torque (hereinafter also called, running-resistance torque disturbance $T_R\hat{}$ or estimated running-resistance torque $T_R\hat{}$) are estimated by means of a disturbance observer based on the plant. Since the inertia of the unit is considerably smaller than that of the vehicle body, the inertia of the vehicle body can be assumed to be almost infinite. Hence, the vibration suppression is achieved so that damping force only acts on the unit. The input (of the motor) u is expressed, using a new variable u' (for the motor) and using estimated drive-shaft torsional-torque $d\hat{}$ as damping force, as follows.

$$u = -d\hat{} + u' \quad (16)$$

The resonance of the drive shaft is suppressed by this damping force. Moreover, if the disturbance is estimated sufficiently quickly, $d \cong d\hat{}$ is established. Hence, the following equation is established from equations (11) and (16).

$$d\omega o/dt = u' \quad (17)$$

Since the resonance of the drive shaft is suppressed by the above-described damping force, when it is assumed that $\omega o \cong \omega t$, the following equation is established from equation (13).

$$Iv \cdot d\omega o/dt = -if To + T_R \quad (18)$$

From equation (18), the new input u' is expressed using a target (driving) torque (of the output shaft) To* and estimated running-resistance torque $T_R\hat{}$, as follows.

$$u' = (-if To* + T_R\hat{})/Iv \quad (19)$$

Figure 11:
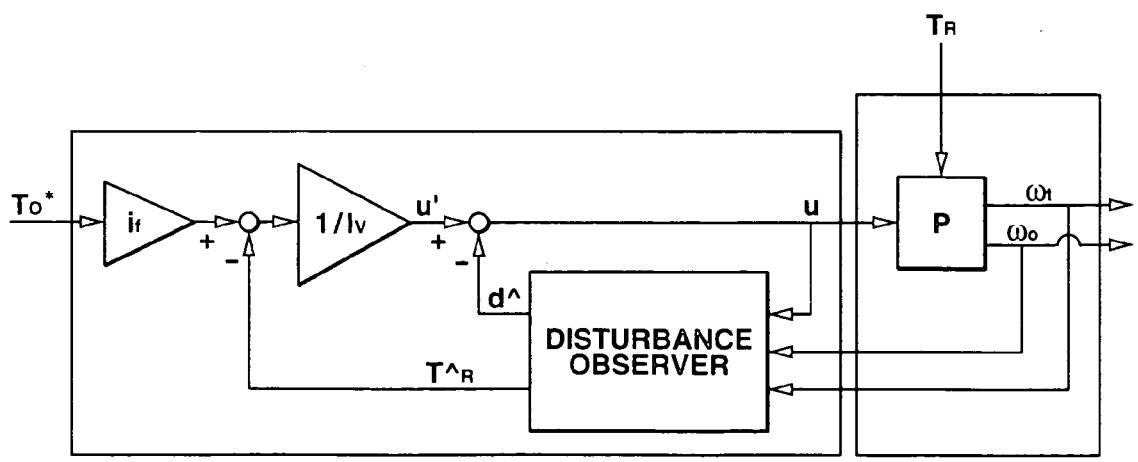
FIG. 11 is a schematic block diagram explaining the motor torque control according to the third embodiment.

FIG. 11 is a block diagram showing the motor torque control system shown in FIG. 10. The plant P in which a system from hybrid transmission TM through the drive shaft to the tire (or, wheel) is modeled, is shown in the right side's portion surrounded by a line in FIG. 11. Plant P receives motor torque u and running resistance torque $T_R$, and outputs output shaft rotation speed $\omega o$ and wheel (or, tire) rotation speed $\omega t$.

"The disturbance observer", "a driving force control system", and "a vibration control system" are shown in the left side's portion surrounded by a line in FIG. 11. "The disturbance observer" receives output shaft rotation speed $\omega o$ and wheel (or, tire) rotation speed $\omega t$ from plant P, and motor torque u. Then, "the disturbance observer" outputs estimated torsional torque $d\hat{}$ to the vibration control system, and outputs estimated running-resistance torque $T_R\hat{}$ to the driving force control system. "The driving force control system" calculates motor torque u' for producing the target acceleration (from equation (19)); by subtracting estimated running-resistance torque $T_R\hat{}$ derived from the disturbance observer, from the value given by multiplying target (driving) torque To* by final gear ratio if, and then multiplying by the reciprocal of the inertia of the vehicle (=inertia of the vehicle body). "The vibration control system" calculates motor torque u, by subtracting estimated torsional torque dˆ (=the disturbance cancellation torque) from motor torque u' for producing the target acceleration.

[Operations and Advantages of the Motor Torque Control]

In the motor torque control apparatus for a hybrid vehicle according to the third embodiment, in the case of "EV-LB mode" or "LB mode" in which low brake LB is engaged, the target driving force is achieved by using the disturbance observer which estimates the running resistance torque and the drive-shaft torsional torque. Hence, a desired acceleration/deceleration of the vehicle is achieved, without using a sensor for sensing the driving force and without the influence of, e.g., inertias of the drive system during transient time of the acceleration or deceleration of the vehicle (i.e., while the vehicle is being accelerated or decelerated). Moreover, without such sensor and influence, acceleration/deceleration fluctuation (or vibration, or variation) in back-and-forth direction of the vehicle due to the resonance of the drive shaft is suppressed.

Namely, disturbance estimating section 161 receives the output shaft rotation speed from vehicle speed sensor 8, the target motor torque from target motor torque calculating section 164, and the wheel rotation speed derived from wheel speed sensor 13. Then disturbance estimating section 161 estimates the running resistance torque and the reaction torque from the drive shaft to transmission TM, as the disturbance. Next, disturbance cancellation quantity calculating section 163 regards the reversely signed value of the estimated reaction torque as the disturbance cancellation torque for suppressing (or, quelling) the resonance of the drive shaft. Target acceleration calculating section 162 calculates the target acceleration of the vehicle, in accordance with the estimated running resistance torque (i.e., corresponding to estimated driving force) derived from disturbance estimating section 161 and the target driving force set on the basis of the accelerator opening, the vehicle speed, and the battery S.O.C. Next, target motor torque calculating section 164 determines the target motor torque which is outputted to motor/generator MG1 or MG2, by using the sum of the disturbance cancellation torque derived from disturbance cancellation quantity calculating section 163 and the target acceleration derived from target acceleration calculating section 162.

Thus, the target driving force is achieved, by using the disturbance observer estimating the running resistance torque and the torsional torque of the drive shaft. Namely, the disturbance observer is composed, which handles the running resistance torque and the drive shaft's torsional torque (=reaction torque) from the drive shaft to the transmission, as the disturbance. Then, the torsional torque and the running resistance torque are estimated by using this disturbance observer and some input (i.e., given) information. The driving force control for producing the target acceleration is achieved, by subtracting the estimated running-resistance torque from the target driving force, and then multiplying this subtraction result by the inverse of inertia of the vehicle body. Moreover, the vibration control for producing the motor torque capable of suppressing the resonance of the drive shaft is achieved, by subtracting the estimated torsional torque from the motor torque for producing the target acceleration.

In the case where the target motor torque (corresponding to the target driving force) is calculated by means of the feedforward control as mentioned above in the previously proposed technique, inertias of drive system (or, drive train) are used for acceleration or deceleration of the vehicle, during transient time of the acceleration or deceleration of the vehicle. Due to this, there is a possibility that the target driving force deviates from the actual driving force, hence the desired acceleration or deceleration of the vehicle cannot be achieved. Moreover, there is a possibility that the fluctuation of acceleration/deceleration (or, accelerating/decelerating) in back-and-forth direction of the vehicle is caused due to the torsional vibration of the drive shaft. However, the motor torque control according to this embodiment also resolves such problems.

As a measure against the torsional vibration of the drive shaft, for example, in a technique as described in the Japanese Patent application publication No. S61(1986)-5318, rotation sensors detect rotation speeds of both ends of a shaft. Then, vibration of the shaft is electronically attenuated in accordance with the detected relative speed or relative angle of both ends of the shaft. In contrast, in the third embodiment according to the present invention, the estimated drive shaft's torsional torque from the disturbance observer is used. Hence, cost increase due to installation of such a rotation speed sensor(s) for suppressing the vibration, can be avoided.

In addition to the above-described first and second embodiments, some configurations and advantages of the motor torque control apparatus according to this third embodiment will now be explained.

The motor torque control apparatus for the hybrid vehicle which has at least one motor/generator to be controlled as a power source, and which runs by transmitting the power to the wheel through the transmission; includes the controller configured to achieve the target driving force by using the disturbance observer estimating the running resistance torque and the torsional torque of the drive shaft. Hence, a desired acceleration/deceleration of the vehicle can be achieved, without using a sensor for sensing the driving force and without the influence of, e.g., inertias of the drive system during transient time of the acceleration or deceleration of the vehicle. Moreover, without such sensor and influence, acceleration/deceleration fluctuation (or, variation) in back-and-forth direction of the vehicle due to the resonance of the drive shaft can be limited.

The above-described controller includes: vehicle speed sensor 8 configured to sense rotation speed of the output shaft of hybrid transmission TM; wheel rotation speed sensor 13 configured to sense rotation speed of the wheel (or, tire) coupled with hybrid transmission TM; disturbance estimating section 161 configured to estimate the running resistance torque and the reaction torque from the drive shaft to hybrid transmission TM, as the disturbance, by receiving the output shaft's rotation speed, the wheel's rotation speed and the target motor torque; disturbance cancellation quantity calculating section 163 configured to regard the reversely signed value of the estimated reaction torque, as the disturbance cancellation torque suppressing the resonance of the drive shaft; target acceleration calculating section 162 configured to calculate the target acceleration of the vehicle, from the target driving force set according to request by a driver or some system, and from the estimated running resistance torque derived from the disturbance estimating section 161; and target motor torque calculating section 164 configured to calculate the target motor torque which is outputted to motor/generator MG1 or MG2, in accordance with the sum of the disturbance cancellation torque derived from disturbance cancellation quantity calculating section 163 and the target acceleration derived from target acceleration calculating section 162. Hence, a desired acceleration/deceleration of the vehicle can be achieved, without checking or monitoring whether the actual driving force accords with the target driving force. Moreover, acceleration/deceleration fluctuation (or, variation) in back-and-forth direction of the vehicle due to the resonance of the drive shaft can also be suppressed without cost increase, by use of the estimated disturbance.

Figure 12:
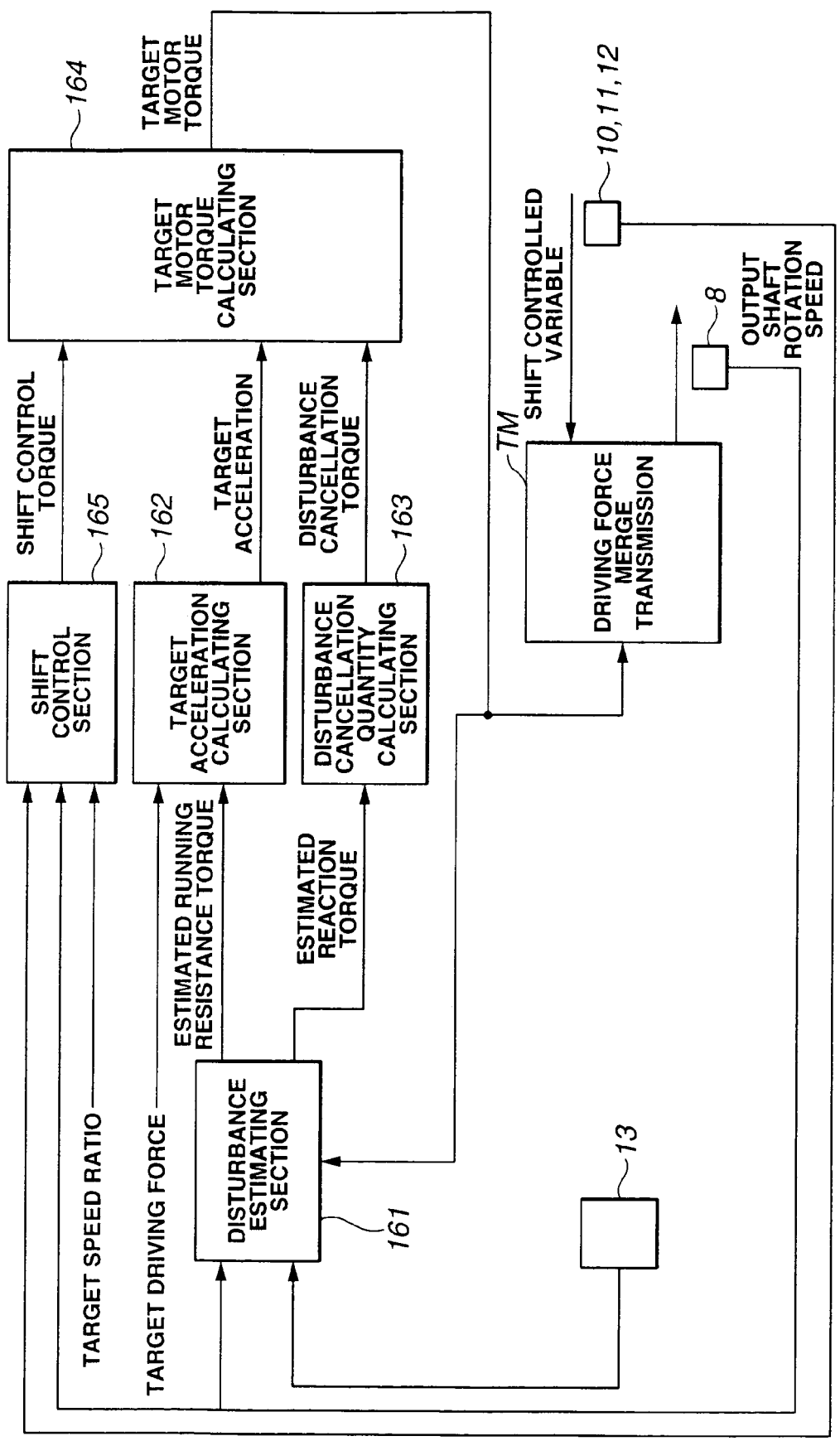
FIG. 12 is a schematic block diagram representing some elements of a motor torque control apparatus according to a fourth embodiment of the present invention.

A fourth embodiment of the motor torque control apparatus according to the present invention will now be explained with reference to FIG. 12.

The fourth embodiment is an example which performs the speed ratio control and the driving force control including the vibration control, in the case of "EV mode" or "E-iVT mode" where low brake LB is open.

In the motor torque control apparatus of the fourth embodiment, a disturbance observer estimates the running resistance torque (i.e., torque according to the running resistance) and the torsional torque of the drive shaft. Then, the disturbance cancellation torque is calculated by reversing sign of the estimated drive shaft's torsional torque, and the target acceleration(/deceleration) of the vehicle is calculated from the estimated running resistance torque. Moreover, the shift control torque is so calculated as to reduce the difference between the actual speed ratio and the target speed ratio. Then, the motor torque is controlled; in such a manner that the sum of this the disturbance cancellation torque and the target acceleration(/deceleration) of the vehicle is only used for variation in acceleration(/deceleration) of the output shaft's rotation, and this shift control torque is only used for the shift controlled variable. The motor torque control apparatus of this embodiment (or, the controller composed of the disturbance observer and motor torque control section in this embodiment) includes accelerator opening sensor 7, vehicle speed sensor 8 (corresponding to the rotation speed sensing section (or, means)), first motor/generator (rotation) speed sensor 10 (corresponding to the rotation speed sensing section (or, means)), second motor/generator (rotation) speed sensor 11 (corresponding to the rotation speed sensing section (or, means)), second ring gear rotation speed sensor 12 (corresponding to the rotation speed sensing section (or, means)), wheel speed sensor 13 (corresponding to the wheel rotation speed sensing section (or, means)), disturbance estimating section (or, means) 161, target acceleration calculating section (or, means) 162, disturbance cancellation quantity calculating section (or, means) 163, target motor torque calculating section (or, means) 164, and a shift control section (or, means) 165, as shown in FIG. 12.

Vehicle speed sensor 8 senses the output-shaft (or, output-axis) rotation speed of hybrid transmission TM and outputs information of the output-shaft rotation speed to disturbance estimating section 161.

Each of first motor/generator speed sensor 10, second motor/generator speed sensor 11, and second ring gear rotation speed sensor 12 outputs rotation speed information of the corresponding power source (or, drive source), as the shift controlled variable, to shift control section 165.

Wheel speed sensor 13 senses the rotation speed of the wheel (or, tire) coupled with hybrid transmission TM, and outputs information of the wheel rotation speed to disturbance estimating section 161.

Shift control section 165 recognizes some one of rotation speeds of the power sources as the shift controlled variable. The ratio between the shift controlled variable and the output-shaft rotation speed is defined as the speed ratio.

Then, shift control section 165 calculates the shift control torque so as to decrease the difference between the defined (actual) speed ratio and the target speed ratio. Additionally, "the target speed ratio" is determined or calculated in accordance with the ratio between the output-shaft rotation speed and a target input rotation speed which is produced, for example, by the target value producing section (superior controller).

Disturbance estimating section 161 estimates the running resistance torque and the reaction torque from the drive shaft to hybrid transmission TM (=torsional torque of the drive shaft), as the disturbance, by receiving the output-shaft rotation speed derived from vehicle speed sensor 8, the wheel rotation speed derived from wheel speed sensor 13 and a target motor torque derived from target motor torque calculating section 164, in the same manner as the third embodiment.

Target acceleration calculating section 162 calculates the target acceleration(/deceleration) of the vehicle, in accordance with the target driving force set according to request by a driver or some system and the estimated running resistance torque derived from disturbance estimating section 161, in the same manner as the third embodiment.

Disturbance cancellation quantity calculating section 163 regards the reversely signed value of the estimated reaction torque (i.e., the value having same absolute value and the opposite sign to the estimated reaction torque), as the disturbance cancellation torque for suppressing resonance of the drive shaft, in the same manner as the third embodiment.

Target motor torque calculating section 164 calculates the target motor torque; in such a manner that the sum of the disturbance cancellation torque derived from disturbance cancellation quantity calculating section 163 and the target acceleration derived from target acceleration calculating section 162 only acts on variation in rotational acceleration of the output shaft, and the shift control torque only acts on the shift controlled variable. Then, target motor torque calculating section 164 outputs the target motor torque(s) to corresponding motor/generators MG1 or MG2.

Next, operations and advantages of this embodiment will now be explained.

[Operations and Advantages of the Motor Torque Control]

In the motor torque control apparatus for a hybrid vehicle according to the fourth embodiment, in "EV mode" or "E-iVT mode" where low brake LB is open, the disturbance observer estimates the running resistance torque and the torsional torque of the drive shaft. Then, the motor torque is so controlled that the sum of the disturbance cancellation torque and the target acceleration of the vehicle is only used to vary rotational acceleration(/deceleration) of the output shaft, and that the shift control torque calculated so as to decrease the difference between the actual speed ratio and the target speed ratio is only used for (variation of) the shift controlled variable. Thus, a desired acceleration/deceleration of the vehicle is achieved without using a sensor for sensing the driving force, and without the influence of, e.g., inertias of the drive system during transient time of the acceleration or deceleration of the vehicle. Moreover, without such sensor and influence, acceleration/deceleration fluctuation (or vibration) in back-and-forth direction of the vehicle due to the resonance of the drive shaft is suppressed.

Namely, shift control section 165 recognizes any one of rotation speeds of the power sources as the shift controlled variable. The ratio between the shift controlled variable and the output-shaft rotation speed is defined as the speed ratio. Then, shift control section 165 calculates the shift control torque so as to decrease the difference between the speed ratio and the target speed ratio. Disturbance estimating section 161 receives the output shaft rotation speed from vehicle speed sensor 8, the wheel rotation speed from wheel speed sensor 13, and the target motor torque from target motor torque calculating section 164. Then, disturbance estimating section 161 estimates the running resistance torque and the reaction torque from the drive shaft to transmission TM, as the disturbance. Next, disturbance cancellation quantity calculating section 163 regards the reversely signed value of the estimated reaction torque as the disturbance cancellation torque for suppressing (or, quelling) the resonance of the drive shaft. Next, target acceleration calculating section 162 calculates the target acceleration (/deceleration) of the vehicle, in accordance with the estimated running resistance torque derived from disturbance estimating section 161, and the target driving force set on the basis of the accelerator opening, the vehicle speed, and the battery S.O.C. Next, target motor torque calculating section 164 calculates the target motor torque(s) which is outputted to motor/generator(s) MG1 and MG2, in such a manner that the sum of the disturbance cancellation torque and the target acceleration (/deceleration) of the vehicle only acts on variation of acceleration of the output shaft's rotation, and that the shift control torque only acts on the shift controlled variable.

Thus, the target motor torque which is outputted to motor/generator MG1 or MG2 is calculated, in such a manner that the sum of the disturbance cancellation torque and the target acceleration of the vehicle only acts on variation in acceleration of the output shaft's rotation and the shift control torque only acts on (variation of) the shift controlled variable (=input rotation speed). Namely, the target motor torque is determined by separately taking two of the sum and the shift control torque into consideration. Regarding the driving force control including the vibration control, in the same manner as the third embodiment, the target motor torque is calculated in such a manner that the variation of acceleration of the output shaft's rotation is regulated or adjusted by a control which produces the target acceleration in consideration of the drive shaft's torsional torque. Regarding the shift control, the target motor torque is calculated, in such a manner that the input rotation speed is adjusted by a feedback control conforming the actual speed ratio to the target speed ratio.

As a result, in the running condition where Ravigneaux-type planetary gear train PGR is in "EV mode" or "E-iVT mode" which is in 2 degrees of freedom and also called continuous speed ratio mode, the motor torque control which compensates variation of the speed ratio is performed. On the other hand, in the case where the target motor torque (corresponding to the target driving force) is calculated by means of the feedforward control as mentioned above in the previously proposed technique, inertias of drive system are used for acceleration or deceleration of the vehicle, during transient time of the acceleration or deceleration of the vehicle. Due to this, there is a problem that the target driving force deviates from the actual driving force, hence the desired acceleration or deceleration of the vehicle cannot be achieved. Moreover, there is a problem that the fluctuation (or vibration) of acceleration/deceleration in back-and-forth direction of the vehicle is caused due to the torsional vibration of the drive shaft. However, the motor torque control according to this embodiment also resolves such problems.

As a countermeasure against the torsional vibration of the drive shaft, for example, in the technique as described in the Japanese Patent application publication No. S61(1986)-5318, rotation sensors detect rotation speeds of both ends of a shaft. Then, vibration of the shaft is electronically attenuated in accordance with the detected relative speed or relative angle between both ends of the shaft. In contrast, in the fourth embodiment according to the present invention, the estimated drive shaft's torsional torque from the disturbance observer is used. Hence, cost increase due to installation of such a rotation speed sensor(s) for suppressing the vibration, can be avoided.

In addition to the above-described first through third embodiments, some configurations and advantages of the motor torque control apparatus according to this fourth embodiment will now be explained.

The motor torque control apparatus for the hybrid vehicle which has at least two motor/generators as power sources and which runs by transmitting the power to the wheel through the transmission including the differential gear having two-degrees-of-freedom in that when any two rotation speeds among power sources and output members of the differential gear are determined, all the remaining rotation speeds are accordingly determined, includes; the controller configured to control motor torque in such a manner that the sum of the disturbance cancellation torque calculated from the reversely signed value of the drive shaft's torsional torque estimated by the disturbance observer, and the vehicle's target acceleration calculated from the running resistance torque estimated by the disturbance observer, is only used for variation in rotational acceleration of the output shaft, and in such a manner that the shift control torque calculated so as to reduce the difference between the actual speed ratio and the target speed ratio is only used for the shift controlled variable. Hence, a desired acceleration/deceleration of the vehicle can be achieved, without using a sensor for sensing the driving force and without the influence of, e.g., inertias of the drive system (or, drive train) during transient time of the acceleration or deceleration of the vehicle. Moreover, without such sensor and influence, acceleration/deceleration vibration in back-and-forth direction of the vehicle due to the resonance of the drive shaft can be limited.

The above-described controller includes: rotation speed sensing section 8, 10, 11 and 12 configured to sense rotation speed of the output shaft and rotation speeds of the power sources; wheel rotation speed sensor 13 configured to sense rotation speed of the wheel (or, tire) coupled with hybrid transmission TM; shift control section 165 configured to regard rotation speed of any power source as the shift controlled variable, and configured to calculate the shift control torque so as to reduce the difference between the target speed ratio and the speed ratio defined by a ratio between the shift controlled variable and the output shaft's rotation speed; disturbance estimating section 161 configured to estimate the running resistance torque and the reaction torque from the drive shaft to hybrid transmission TM, as the disturbance, by receiving the output shaft's rotation speed, the wheel's rotation speed and a target motor torque; disturbance cancellation quantity calculating section 163 configured to regard the reversely signed value of the estimated reaction torque, as the disturbance cancellation torque suppressing the resonance of the drive shaft; target acceleration calculating section 162 configured to calculate the target acceleration of the vehicle, from the target driving force set according to request by a driver or some system, and from the estimated running resistance torque derived from disturbance estimating section 161; and target motor torque calculating section 164 configured to calculate the target motor torque which is outputted to motor/generator MG1 and MG2, in such a manner that the sum of the disturbance cancellation torque and the vehicle's target acceleration is only used for variation in rotational acceleration of the output shaft, and in such a manner that the shift control torque is only used for (the variation of) the shift controlled variable. Hence, a desired acceleration/deceleration of the vehicle can be achieved, without checking or monitoring whether the actual driving force is in conformity with the target driving force. Moreover, acceleration/deceleration variation in back-and-forth direction of the vehicle due to the resonance of the drive shaft can also be suppressed without cost increase, by using the estimated disturbance.

The above-described motor torque control apparatus includes engine E, first motor/generator MG1, and second motor/generator MG2 as power sources, and the transmission is hybrid transmission TM including: the differential gear coupled with engine E, output gear OG toward (driven side part of) the drive system of the vehicle, first motor/generator MG1, and second motor/generator MG2 in such a way that two input/output members of engine E and output gear OG are respectively arrayed inwardly on the differential gear's alignment chart on which at least four input/output members (rotation elements) can be arrayed, and in such a way that two input members of first motor/generator MG1 and the second motor/generator MG2 are respectively arrayed outwardly on the alignment chart; and low brake LB configured to change the mode of hybrid transmission TM between the variable speed ratio mode and the fixed speed ratio mode, by the engagement/disengagement control of low brake LB. Hence, in the case of "EV-LB mode" or "LB mode" where low brake LB is engaged, the motor torque control according to the third embodiment is employed; and in the case of "EV mode" or "E-iVT mode" where low brake LB is open (or, disengaged), the motor torque control according to the fourth embodiment is employed. Hence, in the hybrid vehicle equipped with hybrid transmission TM whose rotation elements (or, members) have changeable degree-of-freedom (i.e., degree of freedom can change in accordance with change of running mode), the desired acceleration/deceleration of the vehicle can be achieved irrespective of the selected running mode, without monitoring whether the actual driving force matches the target driving force. Moreover, acceleration/deceleration fluctuation (or vibration) in back-and-forth direction of the vehicle due to the resonance of the drive shaft can be suppressed without increase in cost, because of the use of the estimated disturbance.

In the third embodiment, the controller includes accelerator opening sensor 7, vehicle speed sensor 8, wheel speed sensor 13, disturbance estimating section (or, means) 161, target acceleration calculating section (or, means) 162, disturbance cancellation quantity calculating section (or, means) 163, and target motor torque calculating section (or, means) 164. However, such a concrete configuration according to the present invention is not limited to the above-described third embodiment, as long as the target driving force is achieved by using a disturbance observer which estimates the torsional torque of a drive shaft and the running resistance torque.

In the fourth embodiment, the controller includes accelerator opening sensor 7, vehicle speed sensor 8, respective speed sensors 10, 11, and 12, wheel speed sensor 13, disturbance estimating section (or, means) 161, target acceleration calculating section (or, means) 162, disturbance cancellation quantity calculating section (or, means) 163, target motor torque calculating section (or, means) 164, and shift control section (or, means) 165. However, such a concrete configuration according to the present invention is not limited to the above-described fourth embodiment, as long as a disturbance observer estimates the running resistance torque and the torsional torque of a drive shaft; the disturbance cancellation torque is calculated by reversing the sign of the estimated drive shaft's torsional torque, and the target acceleration(/deceleration) of the vehicle is calculated from the estimated running resistance torque; and the motor torque is so controlled that the sum of the calculated disturbance cancellation torque and the calculated target acceleration of the vehicle is only used to vary acceleration(/deceleration) of the output shaft's rotation, and is so controlled that the shift control torque calculated so as to decrease the difference between the actual speed ratio and the target speed ratio is only used for (variation of) a shift controlled variable.

In the above-described third and fourth embodiments, it has been exemplified that the motor torque control apparatus according to the present invention is applied to the hybrid vehicle equipped with an engine and two motor/generators as power sources; and a hybrid transmission including a Ravigneaux-type planetary gear train, a low brake and an engine clutch. However, the motor torque control apparatus according to the third embodiment is applicable to an electric vehicle or a hybrid vehicle which includes at least one motor/generator as a power source and runs by transmitting the power to drive wheel(s) (or, tire) through a transmission having a constant speed ratio or variable speed ratio. Moreover, the motor torque control apparatus according to the fourth embodiment is applicable to an electric vehicle or a hybrid vehicle which includes at least two motor/generators as power sources and runs by transmitting the power to drive wheel(s) through a transmission having a two-degrees-of-freedom differential gear (namely, when two rotation speeds among power sources and output members are determined, all the remaining rotation speeds are accordingly determined).

A fifth embodiment of the motor torque control apparatus according to the present invention will now be explained with reference to FIG. 13.

In the motor torque control apparatus of the fifth embodiment, in the case of any one of "EV mode", "EV-LB mode", "LB mode" and "E-iVT mode", a disturbance observer estimates the driving force and then the target motor torque which eliminates the difference between the target driving force and the estimated driving force is calculated (or, produced) by the feedback driving force control. Moreover, in the case of the (time) period of transition of mode change between any two modes among "EV mode", "EV-LB mode", "LB mode" and "E-iVT mode"; the target motor torque which produces (or, achieves) a target acceleration of the vehicle according to acceleration at the start time of the mode change is calculated (or, produced) by feedforward acceleration control.

The motor torque control apparatus of the fifth embodiment (or, the controller composed of the disturbance observer and motor torque control section in the motor torque control apparatus of the fifth embodiment) includes accelerator opening sensor 7, vehicle speed sensor 8 (corresponding to the output-shaft rotation speed sensing section (or, means)), first motor/generator (rotation) speed sensor 10, second motor/generator speed sensor 11, second ring gear rotation speed sensor 12, a disturbance estimating section (or, means) 261, a driving force control section (or, means) 262, a disturbance cancellation quantity calculating section (or, means) 263, a first-target motor torque calculating section (or, means) 264, a shift (or, a speed ratio) control section (or, means) 265, a target acceleration calculating section (or, means) 266, a second-target motor torque calculating section (or, means) 267, a control switching section (or, means) 268, a mode-change-start-time acceleration calculating section (or, means) 269, a mode-change determining section (or, means) 270.

Accelerator opening sensor 7 senses a manipulated quantity (or, variable) of the accelerator by the driver, and outputs information of the accelerator opening to target acceleration calculating section 266.

Vehicle speed sensor 8 senses the output-shaft rotation speed of hybrid transmission (or, driving force merging transmission) TM, and outputs information of the output-shaft rotation speed to disturbance estimating section 261.

Each of first motor/generator speed sensor 10, second motor/generator speed sensor 11, and second ring gear rotation speed sensor 12 outputs rotation speed information of the corresponding power source, as the shift controlled variable (or, controlling variable), to shift control section 265.

Disturbance estimating section 261 estimates the reaction (or, torsional) torque from the drive shaft (or, wheel shaft) to hybrid transmission TM as the disturbance, by receiving the output-shaft rotation speed derived from vehicle speed sensor 8 and the target motor torque derived from first-target motor torque calculating section 264.

Driving force control section 262 recognizes the estimated disturbance derived from disturbance estimating section 261, as the estimated driving force (of the vehicle). Then, driving force control section 262 calculates the driving force control torque, in such a manner that the difference between the estimated driving force and the target driving force (of the vehicle) set according to request by the driver or some system becomes smaller (or, equal to zero). Namely, driving force control section 262 adjusts the driving force control torque so as to bring the estimated driving force closer to the target driving force. In addition, "the target driving force" is generated or determined on the basis of the accelerator opening, the vehicle speed (the output-shaft rotation speed), and the battery S.O.C, by the target value generating section (superior controller).

Disturbance cancellation quantity calculating section 263 receives the estimated disturbance from disturbance estimating section 261. Then, disturbance cancellation quantity calculating section 263 regards the reversely signed value of the estimated disturbance (=estimated torsional torque of the drive shaft) (i.e., a value having same absolute value and the opposite sign to the estimated disturbance), as the disturbance cancellation torque for limiting the resonance of the drive shaft.

In the case of "EV-LB mode" or "LB mode" (having one-degree of rotational freedom) where low brake LB is closed, first-target motor torque calculating section 264 calculates a first target motor torque, in accordance with the sum of the disturbance cancellation torque derived from disturbance cancellation quantity calculating section 263 and the driving force control torque derived from driving force control section 262. Moreover, in the case of "EV mode" or "E-iVT mode" (having two-degrees of rotational freedom) where low brake LB is open, first-target motor torque calculating section 264 calculates the first target motor torque in such a manner that the sum of the disturbance cancellation torque derived from disturbance cancellation quantity calculating section 263 and the driving force control torque derived from driving force control section 262 only acts on variation in acceleration(/deceleration) of the output shaft's rotation, and the shift control torque only acts on the shift controlled variable. Then, first-target motor torque calculating section 264 outputs the first-target motor torque(s) to corresponding motor/generator MG1 or MG2.

Shift control section 265 regards some one of rotation speeds of the power sources as the shift controlled variable. Ratio between the shift controlled variable and the output-shaft rotation speed is defined as the speed ratio. Then, shift control section 265 calculates the shift control torque so as to reduce the difference between the defined (actual) speed ratio and the target speed ratio. Additionally, "the target speed ratio" is determined or calculated in accordance with the ratio between the output-shaft rotation speed and the target input rotation speed which is produced, for example, by the target value producing section (superior controller).

Target acceleration calculating section 266 calculates a target acceleration (i.e., time rate of speed) on the basis of (vehicle's) acceleration at the time of start of the mode change (or, mode transition). In detail, the accelerator opening and the target acceleration of the vehicle at the start time of engagement/disengagement of engine clutch EC or low brake LB for the mode change (namely, the accelerator opening and the target acceleration of the vehicle at the time in which engine clutch EC or low brake LB starts to be engaged/disengaged because of the mode change), are set as default (or, initial) values. Then, (the default value of) the target acceleration of the vehicle is increased/decreased in accordance with increase/decrease of (the default value of) the accelerator opening during engagement or disengagement state of engine clutch EC or low brake LB (i.e., also during partial engagement or disengagement state). In addition, the target driving force may be used instead of the accelerator opening. Namely, the target driving force and the target acceleration of the vehicle at the start time of engagement/disengagement of engine clutch EC or low brake LB for the mode change, are set as default values. Then, the target acceleration of the vehicle may be increased/decreased in accordance with increase/decrease of the target driving force during engagement or disengagement state of engine clutch EC or low brake LB (including partial engagement or disengagement state).

Second-target motor torque calculating section 267 calculates a second target motor torque which is outputted to motor/generator MG1 or MG2, in accordance with the target acceleration derived from target acceleration calculating section 266.

Control switching section 268 selects the first target motor torque derived from first-target motor torque calculating section 264 as a final target motor torque which is outputted to motor/generator MG1 or MG2, under the condition of any one of "EV mode", "EV-LB mode", "LB mode" and "E-iVT mode" (namely, if the vehicle (or, transmission TM) has become in any one of "EV mode", "EV-LB mode", "LB mode" and "E-iVT mode"). On the other hand; during the transition period of mode change (namely, while execution of mode change) between any two modes among "EV mode", "EV-LB mode", "LB mode" and "E-iVT mode"; control switching section 268 selects the second target motor torque derived from second-target motor torque calculating section 267 as the final target motor torque which is outputted to motor/generator MG1 or MG2.

Mode-change-start-time acceleration calculating section 269 calculates (or, checks) a vehicle acceleration at the time in which mode-change-start-time acceleration calculating section 269 receives information of start of the mode change from mode-change determining section 270.

Mode-change determining section 270 determines whether or not, the mode change between any two modes of "EV mode", "EV-LB mode", "LB mode" and "E-iVT mode" is (presently) started. Moreover, mode-change determining section 270 determines whether or not, the mode change is during execution (i.e., in transition period (time) of the mode change). Then, mode-change determining section 270 outputs the mode-change information to control switching section 268 and mode-change-start-time acceleration calculating section 269.

Next, operations and advantages of this embodiment will be explained.

[Process of the Motor Torque Control]

Figure 14:
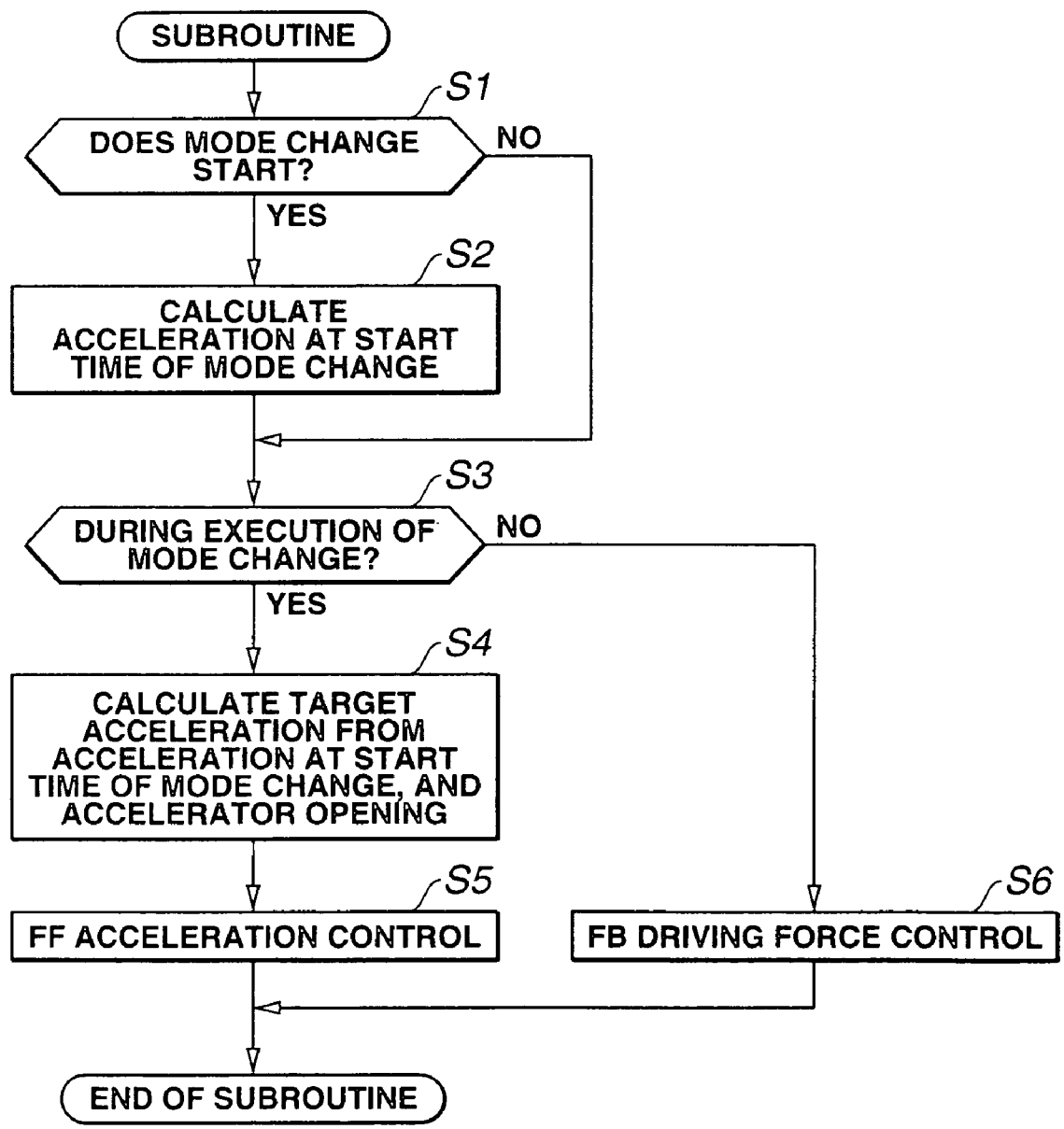
FIG. 14 is an operational flowchart showing a motor torque control process executed by an integrated controller in the fifth embodiment.

FIG. 14 is an operational flowchart showing a motor torque control process (i.e., subroutine processing) executed by integrated controller 6. Each step of this flowchart will now be explained below.

At a step S1, integrated controller 6 determines (or, judges) whether the mode change (now) starts. If YES at step S1, the program proceeds to a step S2. On the other hand, if NO at step S1, the program proceeds to a step S3.

Step S2 follows the determination of mode-change start at step S1. At step S2, mode-change-start-time acceleration calculating section 269 (or, integrated controller 6) calculates (or, checks) the mode-change-start-time acceleration (i.e., acceleration at start time of the mode change). Then, the program proceeds to step S3.

Step S3 follows the determination of step S1 that mode-change does not start, or the calculation of the mode-change-start-time acceleration at step S2. At step S3, integrated controller 6 determines whether the mode change is during execution (i.e., whether the mode change is presently being carried out). If YES at step S3, the program proceeds to a step S4. On the other hand, if NO at step S3, the program proceeds to a step S6.

Step S4 follows the determination of step S3 that the mode change is during execution. At step S4, target acceleration calculating section 266 (or, integrated controller 6) calculates the target acceleration which is increased/decreased according to variation of the accelerator opening from the default point of the vehicle acceleration at start time of the mode change, from the accelerator opening and the mode-change-start-time acceleration.

A step S5 follows the calculation of the target acceleration at step S4. At step S5, integrated controller 6 carries out the feedforward acceleration control; which sets the second target motor torque producing the calculated target acceleration, as a target value of the feedforward control.

Step S6 follows the determination of step S3 that the mode change is not during execution, namely one mode has been already selected (namely, the vehicle is presently in steady state of any one mode of "EV mode", "EV-LB mode", "LB mode" and "E-iVT mode"). At step S6, integrated controller 6 carries out the feedback driving force control; which sets the first target motor torque calculated by using the disturbance observer estimating the driving force, as a target value of the feedback control.

[Driving Force Control and Speed Ratio Control]

Hybrid transmission TM according to this embodiment includes Ravigneaux-type planetary gear train PGR, low brake LB, and engine clutch EC as described above. Hence, the characteristic of hybrid transmission TM changes in accordance with states of low brake LB and engine clutch EC, as follows.

(a) Change of the State of Engine Clutch EC

When engine clutch EC is engaged (i.e., in engaged state), the crank shaft of engine E is integrated with second ring gear R2.

(1) Change of Moment of Inertia

When engine clutch EC is engaged (i.e., in engaged state), moment of inertia of second ring gear R2 and moment of inertia of the rotating part of engine E can be integrated into second ring gear R2 in a modeling approach. When engine clutch EC is open, the moment of inertia of second ring gear R2 does not include the moment of inertia of the rotating part of engine E. When engine clutch EC is partially engaged (or, slipping), namely during transition of the mode change, the moment of inertia of second ring gear R2 includes the moment of inertia of portion of the engine E's rotating part, in accordance with clutch-transmitted torque (i.e., torque transmitted by engine clutch EC).

(2) Change of Torque to be Transmitted to Second Ring Gear R2

When engine clutch EC is engaged (i.e., in engaged state), the engine toque is transmitted to second ring gear R2. When engine clutch EC is open, zero (torque is transmitted to second ring gear R2). When engine clutch EC is partially engaged, namely during the mode transition, the clutch-frictional torque (or, clutch-sliding torque) is transmitted to second ring gear R2.

(b) Change of the State of Low Brake LB

The rotation system of Ravigneaux-type planetary gear train PGR has 2 degrees of freedom (namely, when two rotation speeds among power sources and output members are determined, all the remaining rotation speeds are accordingly determined). However, when low brake LB is engaged (i.e., in engaged state), the rotation system of Ravigneaux-type planetary gear train PGR has single degree of freedom.

(1) Change of Shift Characteristic

When low brake LB is engaged (i.e., in engaged state), the speed ratio (ratio between the input rotation speed and the output rotation speed) is fixed at some predetermined value. When low brake LB is open (including, is partially engaged during the mode transition), the speed ratio is determined in accordance with each rotation speed of the corresponding rotation member, hence the continuously speed ratio control can be achieved.

Therefore, the motor torque control according to this embodiment is switched in accordance with the state of hybrid transmission TM in conformity with the state of low brake LB, as follows. When low brake LB is engaged (i.e., in closed state), namely in steady state of "LB mode" or "EV-LB mode", the motor torque control according to this embodiment performs only the driving force control (including vibration control). When low brake LB is open, namely in steady state of "EV mode" or "E-iVT mode", the motor torque control according to this embodiment performs both of the driving force control (including vibration control) and the speed ratio control.

[Concepts of the Motor Torque Control According to the Present Invention (the Fifth Embodiment)]

The hybrid system according to the fifth embodiment controls or adjusts the respective torques of both motor/generators MG1 and MG2 and engine E, so as to achieve the target driving force. However, such a hybrid system has the resonance due to torsion of the drive shaft. There is a possibility that a vehicle occupant feels uncomfortable vibration due to this resonance. Moreover, during the mode transition, the clutch-frictional torque of engine clutch EC or low brake LB acts on hybrid transmission TM, and then becomes a cause of acceleration/deceleration shock of the vehicle. Therefore, the motor torque control according to this embodiment suppresses the acceleration/deceleration shock of the vehicle and the resonance, while achieving the target driving force.

Figure 15:
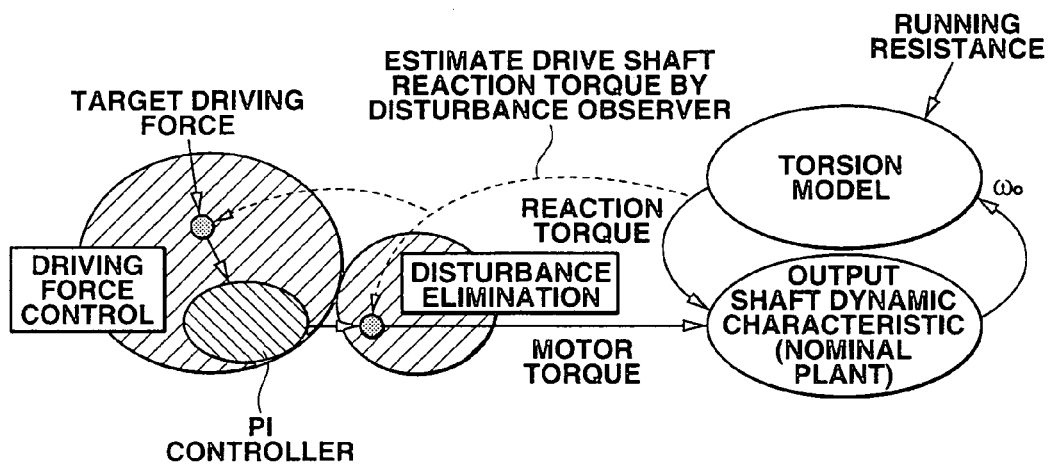
FIG. 15 is an explanatory view representing concepts of the motor torque control executed in the case where a disturbance does not include transmitted torque of an engine clutch or a low brake.

At first, as shown in FIG. 15, a servo system of driving force is composed using the disturbance observer. Namely, the disturbance torque to the unit (=hybrid transmission TM) including the reaction torque of the drive (or, wheel) shaft is estimated from the motor/generator torque and the unit(-output) rotation speed, by using the disturbance observer. Then, the motor/generator produces or generates torque according to the reversely signed value of the estimated disturbance torque (i.e., a value having same absolute value and the opposite sign to the estimated disturbance torque), as the disturbance cancellation torque. Moreover, reaction torque of the drive shaft is equivalent to driving force. Hence, the servo system of driving force is composed, in such a manner that the difference between the target driving force and the estimated reaction torque of the drive shaft becomes equal to zero (or, becomes smaller).

Figure 16:
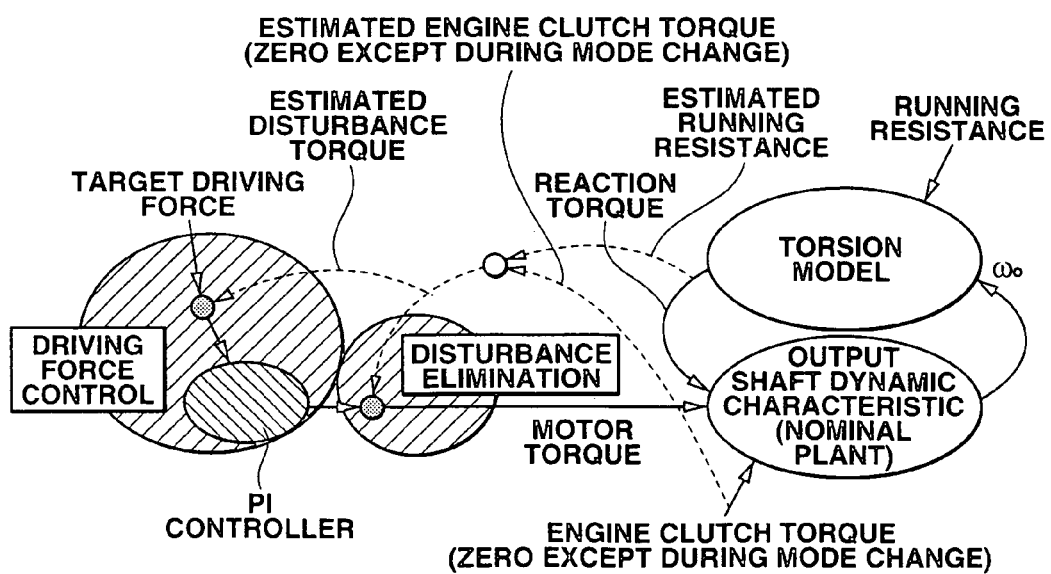
FIG. 16 is an explanatory view representing concepts of the motor torque control executed in the case where the disturbance includes transmitted torque of the engine clutch.

However, the disturbance observer having one degree of rotational freedom (i.e., in "LB mode" or "EV-LB mode") can estimate only one disturbance (i.e., no more than one disturbance). In this mode having one degree of rotational freedom, when the engine clutch is dragging (i.e., partially engaged, or slipping) because of start/stop of the engine, the disturbance to the nominal plant includes the engine clutch torque (i.e., torque from the engine clutch) in addition to the reaction torque of the drive shaft as shown in FIG. 16. As a method for estimating this drag torque (i.e., the engine clutch torque), there is an estimation from hydraulic pressure of the clutch. However, the accuracy of this estimation method is relatively low since the engine torque, a relative rotation speed, and viscous of the oil etc. are not taken into consideration. Hence, even if the slipping torque is subtracted from the estimated disturbance, accuracy of the estimated reaction torque of the drive shaft is low, in the mode having one degree of rotational freedom.

Next, the disturbance observer having two degrees of rotational freedom (i.e., in "EV mode" or "E-iVT mode") can estimate two disturbances (i.e., no more than two disturbances). However, during transition of the mode change between "EV mode" (of electric vehicle mode) having two degrees of rotational freedom and "LB mode" (of hybrid vehicle mode) having one degree of rotational freedom, there is a possibility that both of engine clutch EC and low brake LB are dragging (i.e., partially engaged, or slipping). In that time, three of the engine clutch (drag) torque, the reaction torque of the drive shaft, and the low brake (drag) torque become the disturbance to the nominal plant. Hence, in this case, accuracy of the estimated reaction torque of the drive shaft is also low in the same reason as mentioned above.

If the driving force servo control continues to be carried out as it is, even during the mode transition; there is a situation that the number of actual disturbance(s) is larger than the number that the observer can estimate. In this situation, the gap (or, deviation) between the target driving force and the estimated driving force (the reaction force of the drive shaft) arises, and becomes a cause of acceleration/deceleration shock of the vehicle.

Therefore, in the motor torque control apparatus for a hybrid vehicle according to the fifth embodiment, in the case of any one of "EV mode", "EV-LB mode", "LB mode" and "E-iVT mode", the disturbance observer estimates the driving force and then the target motor torque which eliminates the difference between the target driving force and the estimated driving force is calculated (or, produced) by the feedback driving force control. Moreover, in the case of the period of transition of mode change between any two modes among "EV mode", "EV-LB mode", "LB mode" and "E-iVT mode"; the target motor torque which achieves the target acceleration(/deceleration) of the vehicle according to acceleration at the start time of the mode change is calculated or produced by the feedforward acceleration control. Thus, the resonance and the acceleration/deceleration shock of the vehicle are suppressed, while achieving the target driving force.

[Operations and Advantages of the Motor Torque Control]

In the steady state in which any one of "EV mode", "EV-LB mode", "LB mode" and "E-iVT mode" has already steadied, the program proceeds as step S1→step S3→step S6 in the flowchart of FIG. 14. At step S6, the disturbance observer estimates the driving force, and then the target motor torque which eliminates the difference between the target driving force and the estimated driving force is given by the feedback driving force control.

At start time of the mode transition between any two modes among "EV mode", "EV-LB mode", "LB mode" and "E-iVT mode", the program proceeds as step S1→step S2→step S3→step S6 in the flowchart of FIG. 14. At step S2, the acceleration of the vehicle at start time of the mode change is calculated.

Then, during transition period of the mode change (i.e., during mode change), the program proceeds as step S1→step S2→step S3→step S4→step S5 in the flowchart of FIG. 14. At step S5, the target motor torque which produces (or, achieves) the target acceleration of the vehicle according to the accelerator opening and the vehicular acceleration at start time of the mode change is calculated or produced by the feedforward acceleration control.

Figure 17:
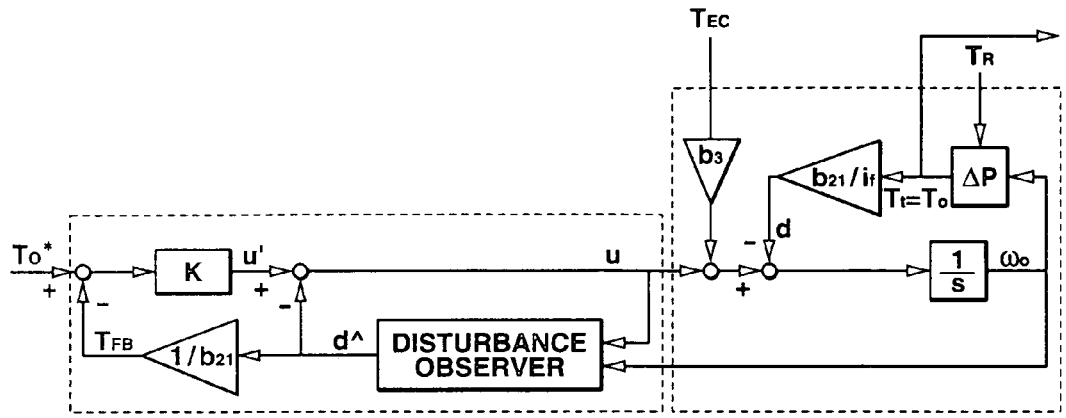
FIG. 17 is a schematic block diagram explaining the motor torque control system achieving a feedback driving force control in steady-state mode, in the motor torque control apparatus according to the fifth embodiment.

FIG. 17 is a schematic block diagram explaining the motor torque control system for achieving the above-described feedback driving force control.

The plant model where the torsion of the drive shaft is taken into consideration, is expressed in the following equations.

$$d\omega o/dt = -(b21/if)Tt + d' + u \qquad (21)$$

$$Iv \cdot d\omega t/dt = Tt + T_R \qquad (22)$$

$$Tt = k\theta \qquad (23)$$

$$d\theta/dt = (\omega o/if) - \omega t \qquad (24)$$

where, $\omega o$ denotes the output shaft (or, axis) rotation speed, $\omega t$ denotes the wheel (or, tire) rotation speed, $\theta$ denotes the torsional angle of the drive shaft, $T_R$ denotes the running resistance torque (i.e., resistance torque in running), d' denotes the disturbance according to the engine-clutch-transmitted torque (i.e., torque transmitted by engine clutch EC) or the low-brake-transmitted torque (i.e., torque transmitted by low brake LB), k denotes the torsional rigidity (or, rigidity of torsion) of the drive shaft, Iv denotes the inertia of the vehicle, if denotes the ratio of the final gear, b21 denotes the constant determined according to the moment of inertia of the unit (hybrid transmission TM), and u denotes the torque for the motor/generator(s).

The dynamic characteristic of the output shaft (or, axis) rotation speed shown in equation (21), namely dynamics according to only hybrid transmission TM, is handled as the nominal plant, as shown in FIG. 17. Then, dynamic characteristics of the drive shaft's torsion shown in equation (24)

and of the wheel (or, tire) rotation speed shown in equation (22), namely dynamics according to the region from the drive shaft toward the driven side, are handled as unmodeled (not-modeled) dynamics. The torsional torque (or, torque of torsion) of the drive shaft is handled as the disturbance to the nominal plant. Then, the disturbance of the drive shaft's torsional torque is estimated by using the disturbance observer based on the nominal plant. The drive shaft's torsional (or, reaction) lo torque is equivalent to the driving force. Hence, the servo system of driving force is composed, in such a manner that the difference between the target driving force and the estimated torsional torque of the drive shaft becomes equal to zero (or, becomes smaller). Moreover, the resonance of the drive shaft can be suppressed, by generating torque according to the estimated disturbance so as to cancel (a torsionaly affected part of) the torsional torque of the drive shaft, by the motor(s).

The estimated disturbance d^ is estimated with wheel (or, tire) torque Tt, low-brake transmitted torque TLB, and engine-clutch transmitted torque TEC, as follows.

$$d\hat{} = -(b21/if)Tt + d' \quad (25)$$

$$d' = b3\ TEC \quad (26)$$

When both of low-brake transmitted torque TLB and engine-clutch transmitted torque TEC are equal to zero, d'=0. When d≅d^ is established, the relation between output rotational acceleration command-value u' and output-shaft's rotation speed ωo is expressed in the following equation, no matter whether low-brake transmitted torque TLB and engine-clutch transmitted torque TEC are equal to zero.

$$d\omega o/dt \cong u' \quad (27)$$

Therefore, a driving force servo controller K substantially calculates output rotational acceleration command-value u' in accordance with the difference between the target driving force and the estimated driving force.

When engine-clutch transmitted torque TEC is equal to zero in the electric vehicle mode, output rotational acceleration command-value u' is target acceleration according to the target driving force. On the other hand, in the hybrid vehicle mode, engine-clutch transmitted torque TEC is not equal to zero (TEC≠0) since the engine torque is transmitted to hybrid transmission TM. This engine torque can be estimated. Hence, the reaction torque of the drive shaft can be estimated by subtracting this estimated engine torque from estimated disturbance d^. Hence, a target acceleration according to the target driving force can be calculated.

However, as described above, the reaction torque of the drive shaft cannot be accurately estimated during transient time between engagement and disengagement (or, open and close) of engine clutch EC. Hence, the target acceleration deviates in accordance with variation of engine-clutch transmitted torque TEC.

Therefore, after (or, at) start time of transition between engagement and disengagement of engine clutch EC (i.e., after start time of the mode change), the driving force servo control is stopped or deactivated. Then, output rotational acceleration command-value u' is calculated or produced in accordance with the value at start time of the mode change, by the feedforward control. Thereby, the target acceleration does not deviate in accordance with variation of engine-clutch transmitted torque TEC, even during transient time between engagement and disengagement of engine clutch EC, hence the acceleration/deceleration shock of the vehicle can be suppressed.

Figure 18A:
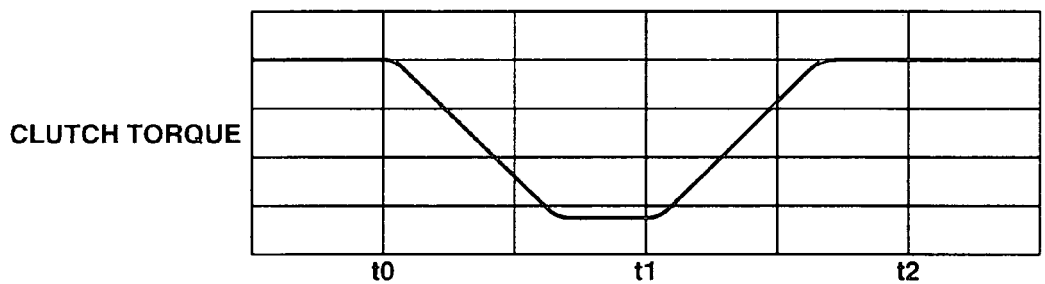
FIGS. 18A and 18B are characteristic views in which vehicular acceleration/deceleration shock according to the fifth embodiment carrying out a feedforward acceleration control during transition time of the engine clutch, is compared with the vehicular acceleration/deceleration shock of a comparative technique maintaining the feedback driving force control during transition time of engine clutch EC.
Figure 18B:
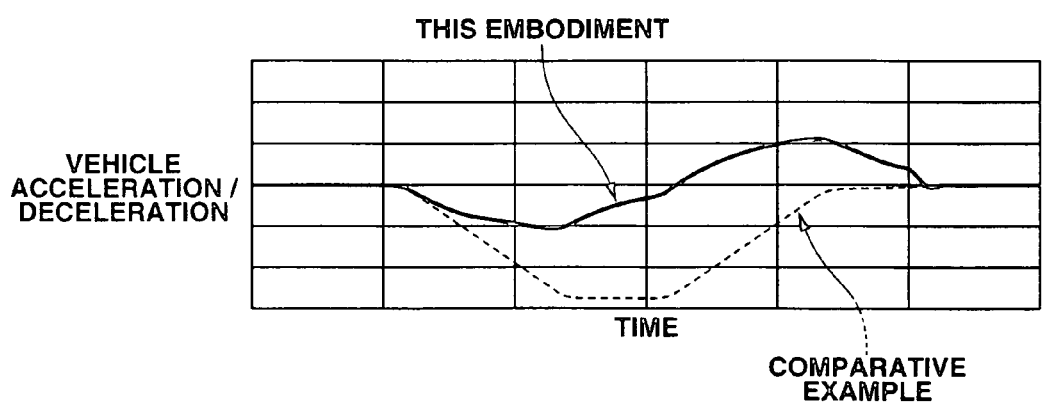

In addition, FIGS. 18A and 18B are characteristic views in which the vehicular acceleration/deceleration shock according to this embodiment is compared with the vehicular acceleration/deceleration shock of a comparative technique. In this embodiment of the present invention, the feedforward acceleration control is performed during transition time between engagement and disengagement of the engine clutch. On the other hand, in the comparative technique, the feedback driving force control is maintained (i.e., performed) during transition time between engagement and disengagement of engine clutch EC. In the case where the engine clutch starts to be disengaged at the time of t0, and then the engine clutch starts to be engaged in the situation in which the engine clutch is not yet fully open at the time of t1, and again the engine clutch finishes to be engaged (i.e., is completely engaged) at the time of t2, as shown in FIG. 18A; the variation of the vehicular acceleration/deceleration during transition time of the engine clutch is suppressed to be relatively lower values in this embodiment as shown in FIG. 18B. In contrast, the variation of the vehicular acceleration/deceleration during transition time of the engine clutch is largely varied this embodiment in the comparative technique as shown in FIG. 18B. Thus, the suppression effect of the acceleration/deceleration shock by the feedforward acceleration control is shown.

In addition to the above-described first through fourth embodiments, some configurations and advantages of the motor torque control apparatus according to this fifth embodiment will now be explained.

The motor torque control apparatus for the hybrid vehicle which has at least one motor/generator as power source and which runs by transmitting the power to the wheel (or, tire) through the transmission whose mode is changed between two different modes of the first mode and the second mode by engagement/disengagement of a friction element, includes; the controller configured to estimate the driving force by the disturbance observer and calculate the target motor torque by the feedback driving force control so as to bring the estimated driving force closer to the target driving force, under the condition of the first mode or the second mode, and configured to calculate the target motor torque which produces the target vehicle's acceleration according to acceleration at start time of the mode change between the first mode and the second mode, by the feedforward acceleration control, during transition of the mode change. Hence, the acceleration/deceleration shock of the vehicle can be suppressed during transition time of the mode change, while achieving the target driving force by means of the estimation of the driving force by the disturbance observer.

The above-described controller includes: vehicle speed sensor 8 configured to sense rotation speed of the output shaft of the transmission; disturbance estimating section 261 configured to estimate the reaction torque from the drive shaft to the transmission as the disturbance, by receiving the output shaft's rotation speed and the target motor torque; driving force control section 262 configured to regard the estimated disturbance as the estimated driving force, and configured to calculate the driving force control torque in such a manner that the estimated driving force is brought closer to the target driving force set according to request by a driver or some system; first-target motor torque calculating section 264 configured to calculate the first target motor torque which is outputted to motor/generator MG1 and/or MG2, in accordance with the driving force control torque; target acceleration calculating section 266 configured to calculate the target acceleration on the basis of acceleration at start time of the mode change; second-target motor torque calculating section 267 configured to calculate the second target motor torque which is outputted to motor/generator MG1 and/or MG2, in accordance with the target acceleration; and control switching section 268 configured to select the first target motor torque derived from first-target motor torque calculating section 264 under the condition of the first mode or the second mode, and configured to select the second target motor torque derived from second-target motor torque calculating section 267 during transition of the mode change between the first mode and the second mode. Hence, the target driving force can be achieved (or, realized) by means of the high-precision estimation of driving force, in which the reaction torque from the drive shaft to the transmission is defined as the estimated driving force, in steady-state of the mode of the transmission (or, the vehicle). Moreover, during transition of the mode change, the acceleration/deceleration shock of the vehicle can be suppressed by the feedforward acceleration control based on acceleration at start time of the mode change.

Target acceleration calculating section 266 is configured to set the (present) target vehicle's acceleration and one of the (present) accelerator opening and the (present) target driving force, at start time of the mode change caused by engagement/disengagement of the friction element, as default values, and configured to increase/decrease the default value of the target vehicle's acceleration in accordance with increase/decrease of the default value of the accelerator opening or the target driving force during (partial) engagement or disengagement state of the friction element. Hence, uncomfortable feeling of the vehicle's acceleration/deceleration in contrast with driver's request of acceleration/deceleration can be limited, since the target acceleration of the vehicle is varied in synchronization with variation of the accelerator opening or the target driving force.

The above-described controller includes disturbance cancellation quantity calculating section 263 configured to regard the reversely signed value of the estimated disturbance, as the disturbance cancellation torque suppressing the resonance of the drive shaft; and first-target motor torque calculating section 264 is configured to calculate the first target motor torque in accordance with the sum of the disturbance cancellation torque and the driving force control torque. Hence, the drive shaft's resonance which causes the vehicle's occupants to feel uncomfortable vibration, can be suppressed without increase in cost, by using the estimated disturbance.

In the above-described motor torque control apparatus, at least one of the first mode and the second mode is the mode having two-degrees-of-rotational-freedom in which when any two rotation speeds among power sources and output members of the transmission are determined, all the remaining rotation speeds are accordingly determined. Moreover, shift control section 265 is configured to regard any one rotation speed of the power sources as the shift controlled variable, and configured to calculate the shift control torque so as to reduce the difference between the speed ratio defined by a ratio between the shift controlled variable and the output shaft's rotation speed, and the target speed ratio. Furthermore, first-target motor torque calculating section 264 is configured to calculate the first target motor torque, in the mode of two-degrees-of-rotational-freedom, in such a manner that the driving force control torque calculated so as to eliminate or reduce the difference between the estimated driving force and the target driving force is only used for variation in rotational acceleration of the output shaft, and in such a manner the shift control torque calculated so as to reduce the difference between the actual (or defined) speed ratio and the target speed ratio is only used for the shift controlled variable. Hence, the target driving force can be achieved by separately performing the driving force control and the shift control, even if at least one mode of two transmission modes (or, vehicle modes) before and after the mode change has two degrees of rotational-freedom.

The above-described motor torque control apparatus includes engine E, first motor/generator MG1, and second motor/generator MG2 as power sources, and the transmission is hybrid transmission TM including: the differential gear coupled with engine E, output gear OG toward (driven side part of) the drive system of the vehicle, first motor/generator MG1, and second motor/generator MG2 in such a way that two input/output members (rotation elements) of engine E and output gear OG are respectively arrayed inwardly on the differential gear's alignment chart on which at least four input/output members can be arrayed, and in such a way that two input members of first motor/generator MG1 and the second motor/generator MG2 are respectively arrayed outwardly on the alignment chart; engine clutch EC configured to change the mode of the vehicle between the hybrid vehicle mode and the electric vehicle mode, by the engagement/disengagement control of engine clutch EC; and low brake LB configured to change the mode of hybrid transmission TM between the variable speed ratio mode and the fixed speed ratio mode, by the engagement/disengagement control of low brake LB. Hence, the target driving force can be achieved by estimating the driving force by means of the disturbance observer in steady mode where any one mode of "EV mode", "EV-LB mode", "LB mode" and "E-iVT mode" has been selected, and also the acceleration/deceleration shock of the vehicle can be suppressed during the mode change between (any two modes of) "EV mode", "EV-LB mode", "LB mode" and "E-iVT mode".

Figure 13:
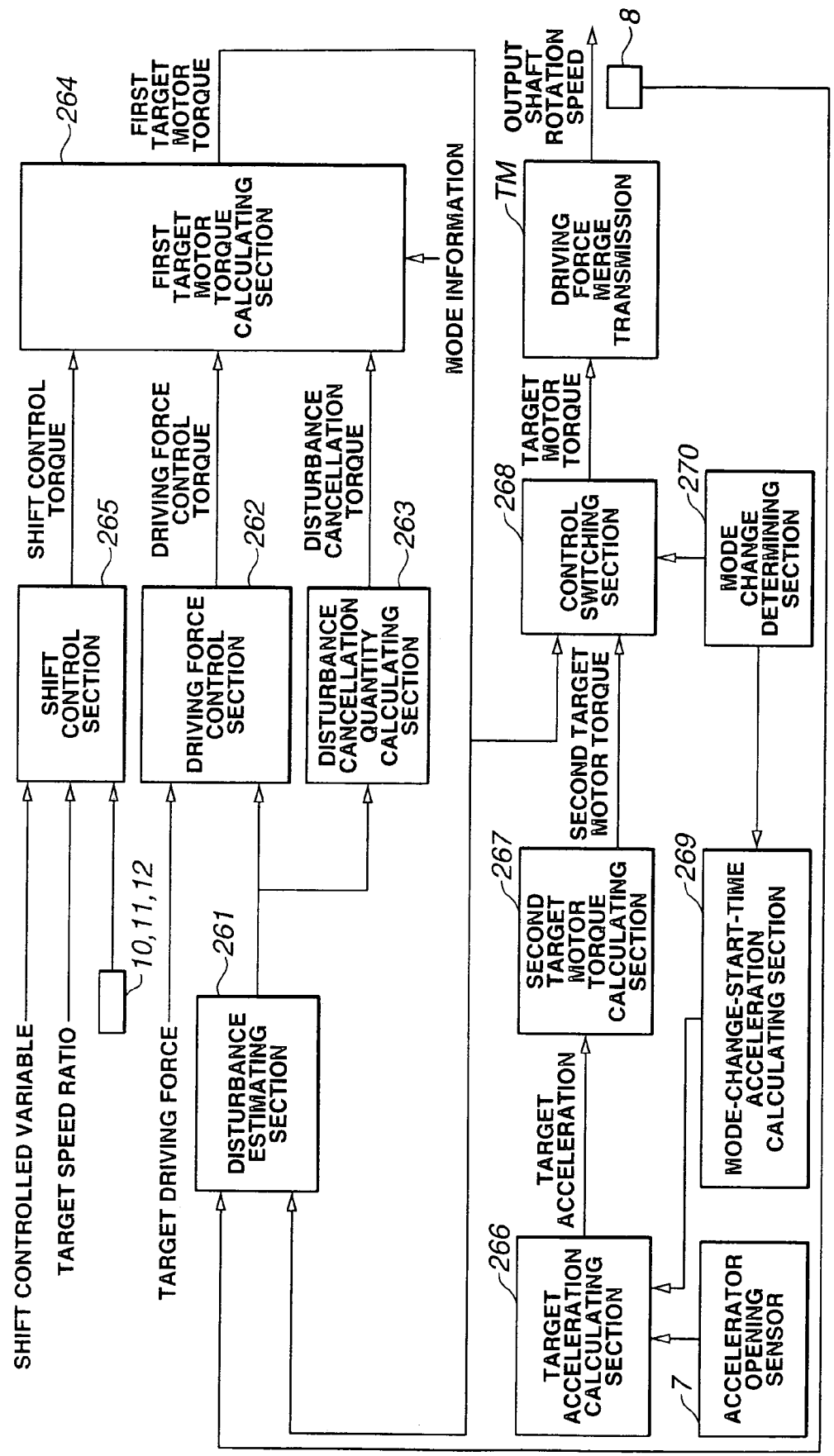
FIG. 13 is a schematic block diagram representing some elements of a motor torque control apparatus according to a fifth embodiment of the present invention.

In the fifth embodiment, the motor torque control apparatus includes respective sections 261 through 270 as shown in FIG. 13. However, such a concrete configuration according to the present invention is not limited to the above-described fifth embodiment; as long as a disturbance observer estimates driving force and then the target motor torque which eliminates or reduces the difference between the target driving force and the estimated driving force is calculated by a feedback driving force control, in a first mode or a second mode; and moreover as long as the target motor torque producing the target vehicular acceleration(/deceleration) according to acceleration at start time of the mode transition between the first mode and second mode is calculated by a feedforward acceleration control, during transient period of the mode transition.

In the above-described fifth embodiment, it has been exemplified that the motor torque control apparatus according to the present invention is applied to the hybrid vehicle equipped with an engine and two motor/generators as power sources; and a hybrid transmission including a Ravigneaux-type planetary gear train, a low brake and an engine clutch. However, the motor torque control apparatus according to the fifth embodiment is applicable to an electric vehicle or a hybrid vehicle which includes; at least one motor/generator as a power source; and a transmission having at least one function of the following three functions, the function that the speed ratio can be varied in accordance with the manner of engagement/disengagement of a clutch/brake, the function that at least one power source except motor/generator can be connected/disconnected (or, engaged/disengaged) by a clutch, and the function that the infinitely-variable transmission mode and the fixed transmission mode can be changed therebetween in accordance with the condition of engagement/disengagement of a clutch/brake.

This application is based on prior Japanese Patent Applications No. 2004-213686 filed on Jul. 21, 2004, No. 2004-227067 filed on Aug. 3, 2004, and No. 2004-227070 filed on Aug. 3, 2004. The entire contents of these Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor torque control apparatus for an automotive vehicle, comprising:
   a transmission which has either one of a fixed speed ratio and a variable speed ratio;
   at least one motor-and-generator coupled with the transmission as a propelling power source of the vehicle, a power of the power source being transmitted to a road wheel for propulsion of the vehicle through the transmission; and
   a controller configured to be electrically connected to the motor-and-generator for motor torque control, the controller comprising
   (a) a disturbance observer that estimates a driving force; and
   (b) a motor torque control section that controls the driving force estimated by the disturbance observer, to bring the estimated driving force closer to a target driving force by way of servo controls,
   wherein the disturbance observer is configured to estimate the driving force of the vehicle from rotation speed of an output shaft of the transmission and a target motor torque for the motor-and-generator.

2. The motor torque control apparatus as claimed in claim 1, wherein the disturbance observer estimates a running resistance torque and a torsional torque of a drive shaft.

3. A motor torque control apparatus for an automotive vehicle, comprising:
   a transmission which has either one of a fixed speed ratio and a variable speed ratio;
   at least one motor-and-generator coupled with the transmission as a propelling power source of the vehicle, a power of the power source being transmitted to a road wheel for propulsion of the vehicle through the transmission; and
   a controller configured to be electrically connected to the motor-and-generator for motor torque control, the controller comprising
   (a) a disturbance observer that estimates a driving force; and
   (b) a motor torque control section that controls the driving force estimated by the disturbance observer, to bring the estimated driving force closer to a target driving force by way of servo control,
   wherein the controller comprises
   an output-shaft rotation speed sensing section configured to sense rotation speed of an output shaft of the transmission;
   a disturbance estimating section configured to estimate a reaction torque from a wheel shaft to the transmission as a disturbance, by receiving the output shaft's rotation speed and a target motor torque;
   a driving force control section configured to regard the estimated disturbance as the estimated driving force, and configured to calculate a driving force control torque to bring the estimated driving force closer to the target driving force set according to request by a driver or some system; and
   a target motor torque calculating section configured to calculate the target motor torque for the motor-and-generator, in accordance with the driving force control torque.

4. The motor torque control apparatus as claimed in claim 3, wherein
   the controller further comprises a disturbance cancellation quantity calculating section configured to regard the reversely signed value of the estimated disturbance, as a disturbance cancellation torque suppressing a resonance of the wheel shaft; and
   the target motor torque calculating section is configured to calculate the target motor torque in accordance with the sum of the disturbance cancellation torque and the driving force control torque.

5. A motor torque control apparatus for an automotive vehicle comprising:
   a transmission which has either one of a fixed speed ratio and a variable speed ratio;
   at least one motor-and-generator coupled with the transmission as a propelling power source of the vehicle, a power of the power source being transmitted to a road wheel for propulsion of the vehicle through the transmission; and
   a controller configured to be electrically connected to the motor-and-generator for motor torque control, the controller comprising
   (a) a disturbance observer that estimates a driving force; and
   (b) a motor torque control section that controls the driving force estimated by the disturbance observer, to bring the estimated driving force closer to a target driving force by way of servo control,
   wherein the automotive vehicle is an electric or hybrid vehicle which has at least two motor-and-generators as power sources and which runs by transmitting the power to the wheel through the transmission including a differential gear having two-degrees-of-freedom in that when any two rotation speeds among power sources and output members of the differential gear are determined, all the remaining rotation speeds are accordingly determined, and wherein
   the controller is configured to control motor torque in such a manner that
   a driving force control torque calculated so as to bring the estimated driving force closer to the target driving force is only used for variation in rotational acceleration of an output shaft, and
   a shift control torque calculated so as to reduce the difference between an actual speed ratio and a target speed ratio is only used for a shift controlled variable.

6. The motor torque control apparatus as claimed in claim 5, wherein the controller comprises:
   a rotation speed sensing section configured to sense rotation speed of the output shaft and one of rotation speeds of the power sources;
   a shift control section configured to regard the sensed rotation speed of the power source as the shift controlled variable, and configured to calculate the shift control torque so as to reduce the difference between the target speed ratio and the speed ratio defined by a ratio between the shift controlled variable and the output shaft's rotation speed;

a disturbance estimating section configured to estimate a reaction torque from a wheel shaft to the transmission as a disturbance, by receiving the output shaft's rotation speed and a target motor torque;

a driving force control section configured to regard the estimated disturbance as the estimated driving force, and configured to calculate the driving force control torque to bring the estimated driving force closer to the target driving force set according to request by a driver or some system; and a target motor torque calculating section configured to calculate the target motor torque for the motor-and-generator, in such a manner that the driving force control torque is only used for variation in rotational acceleration of the output shaft and the shift control torque is only used for the shift controlled variable.

7. The motor torque control apparatus as claimed in claim 6, wherein the controller further comprises a disturbance cancellation quantity calculating section configured to regard the reversely signed value of the estimated disturbance, as a disturbance cancellation torque suppressing a resonance of the wheel shaft; and the target motor torque calculating section is configured to calculate the target motor torque in such a manner that, the sum of the disturbance cancellation torque and the driving force control torque is only used for variation in rotational acceleration of the output shaft, and the shift control torque is only used for the shift controlled variable.

8. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to bring the estimated driving force closer to a target driving force by way of servo control, wherein the motor torque control apparatus comprises an engine, a first motor-and-generator, and a second motor-and-generator as power sources, and the transmission is a hybrid transmission for the hybrid vehicle, the hybrid transmission including: a differential gear coupled with the engine, an output member toward a drive system of the vehicle, the first motor-and-generator, and the second motor-and-generator in such a way that two rotation members of the engine and the output member are respectively arrayed inwardly on an alignment chart of the differential gear, on which at least four rotation members can be arrayed, and two rotation members of the first motor-and-generator and the second motor-and-generator are respectively arrayed outwardly on the alignment chart; and a friction element configured to change the mode of the transmission between a variable speed ratio mode and a fixed speed ratio mode, by an engagement/disengagement control of the friction element.

9. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to bring the estimated driving force closer to a target driving force by way of servo control, wherein the disturbance observer estimates a running resistance torque and a torsional torque of a drive shaft, and wherein the controller comprises:

an output-shaft rotation speed sensing section configured to sense rotation speed of an output shaft of the transmission;

a wheel rotation speed sensing section configured to sense rotation speed of a wheel coupled with the transmission;

a disturbance estimating section configured to estimate the running resistance torque and the reaction torque from the drive shaft to the transmission, as a disturbance, by receiving the output shaft's rotation speed, the wheel's rotation speed and a target motor torque;

a disturbance cancellation quantity calculating section configured to regard the reversely signed value of the estimated reaction torque, as a disturbance cancellation torque suppressing a resonance of the drive shaft;

a target acceleration calculating section configured to calculate a target acceleration of the vehicle, from the target driving force set according to request by a driver or some system, and from the estimated running resistance torque derived from the disturbance estimating section; and a target motor torque calculating section configured to calculate the target motor torque for the motor-and-generator, in accordance with the sum of the disturbance cancellation torque derived from the disturbance cancellation quantity calculating section and the target acceleration derived from the target acceleration calculating section.

10. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to bring the estimated driving force closer to a target driving force by way of servo control, wherein the disturbance observer estimates a running resistance torque and a torsional torque of a drive shaft, wherein the automotive vehicle is an electric or hybrid vehicle which has at least two motor-and-generators as power sources and which runs by transmitting the power to the wheel through the transmission including a differential gear having two-degrees-of-freedom in that when any two rotation speeds among power sources and output members of the differential gear are determined, all the remaining rotation speeds are accordingly determined, and wherein the controller is configured to control motor torque in such a manner that the sum of a disturbance cancellation torque calculated from the reversely signed value of the drive shaft's torsional torque estimated by the disturbance observer, and a vehicle's target acceleration calculated from the running resistance torque estimated by the disturbance observer, is only used for variation in rotational acceleration of an output shaft, and a shift control torque calculated so as to reduce the difference between an actual speed ratio and a target speed ratio is only used for a shift controlled variable.

11. The motor torque control apparatus as claimed in claim 10, wherein the controller comprises:

a rotation speed sensing section configured to sense rotation speed of the output shaft and one of rotation speeds of the power sources;

a wheel rotation speed sensing section configured to sense rotation speed of the wheel coupled with the transmission;

a shift control section configured to regard the sensed rotation speed of the power source as the shift controlled variable, and configured to calculate the shift control torque so as to reduce the difference between the speed ratio defined by a ratio between the shift controlled variable and the output shaft's rotation speed, and the target speed ratio;

a disturbance estimating section configured to estimate the running resistance torque and the reaction torque from the drive shaft to the transmission, as a disturbance, by receiving the output shaft's rotation speed, the wheel's rotation speed and a target motor torque;

a disturbance cancellation quantity calculating section configured to regard the reversely signed value of the estimated reaction torque, as a disturbance cancellation torque suppressing a resonance of the drive shaft;

a target acceleration calculating section configured to calculate the target acceleration of the vehicle, from the target driving force set according to request by a driver or some system, and from the estimated running resistance torque derived from the disturbance estimating section; and a target motor torque calculating section configured to calculate the target motor torque for the motor-and-generator, in such a manner that the sum of the disturbance cancellation torque and the vehicle's target acceleration is only used for variation in rotational acceleration of the output shaft, and that the shift control torque is only used for the shift controlled variable.

12. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to bring the estimated driving force closer to a target driving force by way of servo control, wherein the disturbance observer estimates a running resistance torque and a torsional torque of a drive shaft, and wherein the motor torque control apparatus comprises an engine, a first motor-and-generator, and a second motor-and-generator as power sources, the transmission is a hybrid transmission for a hybrid vehicle, the hybrid transmission including:

a differential gear coupled with the engine, an output member toward a drive system of the vehicle, the first motor-and-generator, and the second motor-and-generator in such a way that two rotation members of the engine and the output member are respectively arrayed inwardly on an alignment chart of the differential gear, on which at least four rotation members can be arrayed, and two rotation members of the first motor-and-generator and the second motor-and-generator are respectively arrayed outwardly on the alignment chart; and a friction element configured to change the mode of the transmission between a variable speed ratio mode and a fixed speed ratio mode, by an engagement/disengagement control of the friction element.

13. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) a disturbance observer that estimates a driving force; and (b) a motor torque control section that controls the driving force estimated by the disturbance observer, to, bring the estimated driving force closer to a target driving force by way of servo control, wherein the motor torque control apparatus further comprises a friction element configured to change the mode of the transmission between two different modes of a first mode and a second mode by an engagement/disengagement of the friction element, and wherein the controller is configured to estimate the driving force by the disturbance observer and calculate a target motor torque by a feedback driving force control to bring the estimated driving force closer to the target driving force, under the condition of the first mode or the second mode, and is configured to calculate the target motor torque which achieves a target vehicle's acceleration according to acceleration at start time of the mode change between the first mode and the second mode, by a feed forward acceleration control, during transition of the mode change.

14. The motor torque control apparatus as claimed in claim 13, wherein the controller comprises:

an output-shaft rotation speed sensing section configured to sense rotation speed of an output shaft of the transmission;

a disturbance estimating section configured to estimate a reaction torque from a drive shaft to the transmission as a disturbance, by receiving the output shaft's rotation speed and the target motor torque;

a driving force control section configured to regard the estimated disturbance as the estimated driving force, and configured to calculate a driving force control torque to bring the estimated driving force closer to the target driving force set according to request by a driver or some system;

a first-target motor torque calculating section configured to calculate a first target motor torque for the motor-and-generator, in accordance with the driving force control torque;

a target acceleration calculating section configured to calculate the target acceleration on the basis of acceleration at start time of the mode change;

a second-target motor torque calculating section configured to calculate a second target motor torque for the motor-and-generator, in accordance with the target acceleration; and a control switching section configured to select the first target motor torque derived from the first-target motor torque calculating section under the condition of the first mode or the second mode, and select the second target motor torque derived from the second-target motor torque calculating section during transition of the mode change between the first mode and the second mode.

15. The motor torque control apparatus as claimed in claim 14, wherein the target acceleration calculating section is configured to set the present target vehicle's acceleration and one of a present accelerator opening and the present target driving force, at start time of the mode change caused by engagement/disengagement of the friction element, as default values, and configured to increase/decrease the default value of the target vehicle's acceleration in accordance with increase/decrease of the default value of the accelerator opening or the target driving force during engagement or disengagement state of the friction element.

16. The motor torque control apparatus as claimed in claim 14, wherein the controller further comprises a disturbance cancellation quantity calculating section configured to regard the reversely signed value of the estimated disturbance, as a disturbance cancellation torque suppressing a resonance of the drive shaft; and the first-target motor torque calculating section is configured to calculate the first target motor torque in accordance with the sum of the disturbance cancellation torque and the driving force control torque.

17. The motor torque control apparatus as claimed in claim 14, wherein:

at least one of the first mode and the second mode is the mode having two-degrees-of-rotational-freedom in which when any two rotation speeds among power sources and output members of the transmission are determined, all the remaining rotation speeds are accordingly determined;

the controller further comprises a shift control section configured to regard any one rotation speed of the power sources as a shift controlled variable, and configured to calculate a shift control torque so as to reduce the difference between a speed ratio defined by the ratio between the shift controlled variable and the output shaft's rotation speed, and a target speed ratio; and the first-target motor torque calculating section configured to calculate the first target motor torque, in the case of the mode having two-degrees-of-rotational-freedom, in such a manner that the driving force control torque calculated so as to bring the estimated driving force closer to the target driving force is only used for variation in rotational acceleration of the output shaft, and the shift control torque calculated so as to reduce the difference between the actual speed ratio and the target speed ratio is only used for the shift controlled variable.

18. The motor torque control apparatus as claimed in claim 13, wherein the motor torque control apparatus comprises an engine, a first motor-and-generator, and a second motor-and-generator as power sources, the transmission is a hybrid transmission for a hybrid vehicle, the hybrid transmission including:

a differential gear coupled with the engine, an output member toward a drive system of the vehicle, the first motor-and-generator, and the second motor-and-generator in such a way that two rotation members of the engine and the output member are respectively arrayed inwardly on an alignment chart of the differential gear, on which at least four rotation members can be arrayed, and two rotation members of the first motor-and-generator and the second motor-and-generator are respectively arrayed outwardly on the alignment chart;

an engine clutch configured to change the mode of the vehicle between a hybrid vehicle mode and an electric vehicle mode, by an engagement/disengagement control of the engine clutch; and a low brake configured to change the mode of the transmission between a variable speed ratio mode and a fixed speed ratio mode, by an engagement/disengagement control of the low brake.

19. A motor torque control apparatus for an automotive vehicle, comprising:

a transmission which has either one of a fixed speed ratio and a variable speed ratio;

at least one motor-and-generator coupled with the transmission as a propelling power source of the vehicle, a power of the power source being transmitted to a road wheel for propulsion of the vehicle through the transmission; and a controller configured to be electrically connected to the motor-and-generator for motor torque control, the controller comprising (a) observer means for estimating a driving force of the vehicle from rotation speed of an output shaft of the transmission and a target motor torque for the motor-and-generator; and (b) control means for controlling the driving force estimated by the observer means, to bring the estimated driving force closer to a target driving force by way of servo control.

20. A motor torque control method for an automotive vehicle, the vehicle being an electric or hybrid vehicle which has at least one motor-and-generator as a propelling power source and which runs by transmitting a power of the power source to a road wheel through a transmission, the motor torque control method comprising:

estimating a driving force of the vehicle from rotation speed of an output shaft of the transmission and a target motor torque for the motor-and-generator, by a disturbance observer; and controlling the motor-and-generator to bring the estimated driving force closer to a target driving force by way of servo control.

* * * * *